US010091622B2

(12) United States Patent
Elias et al.

(10) Patent No.: US 10,091,622 B2
(45) Date of Patent: Oct. 2, 2018

(54) POSITION TRACKING FOR A BEARER OF MOBILE DEVICE

(71) Applicant: Fraunhofer Portugal Research, Oporto (PT)

(72) Inventors: Dirk Elias, Matosinhos (PT); Vânia Guimarães, Vila Nova de Gaia (PT); Bruno Aguiar, Póvoa de Varzim (PT); Lourenço Castro, Oporto (PT); David Ribeiro, Vila Nova de Gaia (PT); Manuel Monteiro, Braga (PT); Tiago Rocha, Guetim/Espinho (PT); Carlos Ferreira, Oporto (PT); Susana Carneiro, Esposende (PT); André Costa Lima, Maia (PT); Joana Silva, Amarante (PT); Renato Oliveira, Oporto (PT)

(73) Assignee: Fraunhofer Portugal Research, Oporto (PT)

( * ) Notice: Subject to any disclaimer, the term of this patent is extended or adjusted under 35 U.S.C. 154(b) by 0 days.

(21) Appl. No.: 15/234,686

(22) Filed: Aug. 11, 2016

(65) Prior Publication Data

US 2016/0353246 A1    Dec. 1, 2016

Related U.S. Application Data

(63) Continuation of application No. PCT/EP2014/052953, filed on Feb. 14, 2014.

(51) Int. Cl.
*H04W 4/02* (2018.01)
*G01C 21/20* (2006.01)
(Continued)

(52) U.S. Cl.
CPC ............ *H04W 4/027* (2013.01); *G01C 21/20* (2013.01); *G01C 22/006* (2013.01);
(Continued)

(58) Field of Classification Search
CPC ..... H04W 4/027; H04W 4/028; H04W 4/005; H04W 4/02; G01C 22/006; G01C 21/20;
(Continued)

(56) References Cited

U.S. PATENT DOCUMENTS

| 8,412,183 | B1 | 4/2013 | Kadous et al. |
| 2006/0125644 | A1 | 6/2006 | Sharp et al. |
| 2008/0105065 | A1 | 5/2008 | Lee et al. |
| 2008/0120062 | A1* | 5/2008 | Lee ...................... G01C 22/006 |
| | | | 702/160 |
| 2008/0234935 | A1 | 9/2008 | Wolf et al. |
| 2009/0140043 | A1 | 6/2009 | Graves et al. |
| 2009/0201896 | A1 | 8/2009 | Davis et al. |
| 2009/0204354 | A1 | 8/2009 | Davis et al. |
| 2011/0087450 | A1 | 4/2011 | Borenstein et al. |
| 2011/0143779 | A1 | 6/2011 | Rowe et al. |
| 2011/0306323 | A1 | 12/2011 | Do et al. |
| 2012/0007779 | A1 | 1/2012 | Klepal et al. |
| 2013/0028609 | A1 | 1/2013 | Staats et al. |

(Continued)

FOREIGN PATENT DOCUMENTS

| EP | 1022578 A2 | 7/2000 |
| WO | 2012059542 A1 | 5/2012 |
| WO | 2013016875 A1 | 2/2013 |

*Primary Examiner* — Chuong A Ngo
(74) *Attorney, Agent, or Firm* — Michael A. Glenn; Perkins Coie LLP

(57) ABSTRACT

Mostly, motion signals are inaccurate, especially if the mobile device is not a proprietary device, and one has to reckon that the bearer wears the mobile device somewhere else than where it is supposed to be worn in order to coincide with the laboratory conditions. However, the information conveyed by the motion signals is sufficient in order to discriminate and detect between different typical wearing/carrying conditions, and accordingly position tracking based on such motion signals may be rendered far more efficiently by, first of all, using the motion signals gained from the one or more motion sensors so as to attribute them to one of a plurality of analysis parameter sets so as to obtain a selected analysis parameter set and, second, analyzing the motion signals using the selected analysis parameter set so as to obtain a signal indicating a locomotion of the bearer.

18 Claims, 10 Drawing Sheets

(51) Int. Cl.
    *G01C 22/00*     (2006.01)
    *G06K 9/00*     (2006.01)
    *H04W 4/029*     (2018.01)
    *H04W 4/70*     (2018.01)
    *G06K 9/22*     (2006.01)

(52) U.S. Cl.
    CPC ........ *G06K 9/00348* (2013.01); *H04W 4/029* (2018.02); *H04W 4/70* (2018.02); *G06K 9/00536* (2013.01); *G06K 9/22* (2013.01); *H04W 4/02* (2013.01)

(58) Field of Classification Search
    CPC ... G06K 9/00348; G06K 9/00536; G06K 9/22
    See application file for complete search history.

(56) References Cited

U.S. PATENT DOCUMENTS

| | | |
|---|---|---|
| 2013/0029685 A1 | 1/2013 | Moshfeghi et al. |
| 2013/0053056 A1 | 2/2013 | Aggarwal et al. |
| 2013/0085677 A1 | 4/2013 | Modi et al. |
| 2013/0244700 A1 | 9/2013 | Elias et al. |
| 2014/0046586 A1 | 2/2014 | Keal et al. |
| 2014/0291480 A1 | 10/2014 | Bruder et al. |
| 2016/0100290 A1 | 4/2016 | Smith |

\* cited by examiner

POSITION TRACKING FOR A BEARER OF MOBILE DEVICE

CROSS-REFERENCE TO RELATED APPLICATIONS

This application is a continuation of copending International Application No. PCT/EP2014/052953, filed Feb. 14, 2014, which is incorporated herein by reference in its entirety.

BACKGROUND OF THE INVENTION

The present application is concerned with tracking the position of a bearer of a mobile device.

A multitude of positioning systems are currently known. The most common systems are based on satellite based methods, which however necessitate the availability of satellite RF signals. For this reason, the latter systems are of no use inside of buildings, or at least of restricted use only.

Positioning systems dedicated for use inside of buildings often rely on received signal strength measurements of RF signals such as GSM, WiFi, Bluetooth or the like. Sometimes, the cellular structure of such an arrangement of transmitting nodes in a network is used for a coarse localization. However, using the just mentioned kind of positioning systems necessitates that investments be made, and these investments are often too high compared to their benefit with respect to inside localization. Furthermore, these systems are relatively imprecise and often do not enable differentiating between positions in front of and behind a certain obstacle, such as a wall, a door, a barrier or the like.

Other positioning systems for interior zones use beacons based on infrared, RF, and/or magnetism, placed at predetermined positions and rendering, by way of their limited reach of their output signals, individual locations, i.e. their surroundings, distinguishable and identifiable. However, position determination is feasible merely at those locations where the output signal of the beacon may be received, i.e. in the surroundings of the beacon, the size of which is determined by the beacon's reach.

A further method of determining the position in interior rooms uses sensors which detect the movement of a body, such as of a human or some other object so that the position thereof may be determined relative to some reference location. However, with increasing distance from the reference locations, the position determined becomes increasingly unreliable, as with increasing time and distance from the reference locations, the numbers of detected movements increases, which in turn causes that drifts negatively affect the position determined. In effect, the position inaccuracy becomes so high, that the latter positioning systems are useless for most application sceneries.

Accordingly, it would be favorable to have a concept at hand which allows tracking a position of a bearer of a mobile device independent from the environmental conditions more efficiently, such as with necessitating less efforts, costs and so forth and/or at increased accuracy.

SUMMARY

According to an embodiment, an apparatus for tracking a position of a bearer of a mobile device on the basis of one or more motion sensors included by the mobile device may have: a discriminator configured to, based on motion signals gained from the one or more motion sensors, select one of a plurality of analysis parameter sets so as to obtain a selected analysis parameter set, by discriminating between different signal patterns associated with the analysis parameter sets; and an analyzer configured to analyze the motion signals using the selected analysis parameter set so as to obtain a signal indicating a locomotion of the bearer, wherein the analyzer is configured to update, on the basis of the signal indicating the locomotion of the bearer, a position signal indicating a position of the bearer, compare the position signal with map data and/or discontinuously occurring registration signals indicating the mobile device's passing of any predetermined reference location so as to correct the position signal and obtain a correction signal and adjust the selected analysis parameter set and/or bearer specific data used to perform the update of the position signal on the basis of the signal indicating the locomotion of the bearer, depending on the correction signal.

According to another embodiment, an apparatus for tracking a position of a bearer of a mobile device on the basis of one or more motion sensors comprised by the mobile device may have: a discriminator configured to, based on motion signals gained from the one or more motion sensors, select one of a plurality of analysis parameter sets so as to obtain a selected analysis parameter set, by discriminating between different signal patterns associated with the analysis parameter sets; and an analyzer configured to analyze the motion signals using the selected analysis parameter set so as to obtain a signal indicating a locomotion of the bearer, wherein the analyzer is configured to attenuate smaller propelling distance and direction change values of the signal indicating the locomotion of the bearer more than higher values thereof, and store a history concerning a most recently passed portion of the signal, in an unattenuated version, and/or the motion signals and to redo the analysis using a lower attenuation strength, on the basis of the history stored in case of realizing that the bearer starts a turn.

Another embodiment may have a system including an inventive apparatus and beacons at reference locations.

Another embodiment may have a system including an inventive apparatus and beacons at reference locations.

According to another embodiment, a method for tracking a position of a bearer of a mobile device on the basis of one or more motion sensors comprised by the mobile device may have the steps of: based on motion signals gained from the one or more motion sensors, selecting one of a plurality of analysis parameter sets so as to obtain a selected analysis parameter set, by discriminating between different signal patterns associated with the analysis parameter sets; and analyzing the motion signals using the selected analysis parameter set so as to obtain a signal indicating a locomotion of the bearer, wherein the analyzing includes updating, on the basis of the signal indicating the locomotion of the bearer, a position signal indicating a position of the bearer, comparing the position signal with map data and/or discontinuously occurring registration signals indicating the mobile device's passing of any predetermined reference location so as to correct the position signal and obtain a correction signal and adjusting the selected analysis parameter set and/or bearer specific data used to perform the update of the position signal on the basis of the signal indicating the locomotion of the bearer, depending on the correction signal.

According to another embodiment, a method for tracking a position of a bearer of a mobile device on the basis of one or more motion sensors comprised by the mobile device may have the steps of: based on motion signals gained from the one or more motion sensors, selecting one of a plurality of analysis parameter sets so as to obtain a selected analysis parameter set, by discriminating between different signal patterns associated with the analysis parameter sets; and analyzing the motion signals using the selected analysis parameter set so as to obtain a signal indicating a locomotion of the bearer, wherein the analyzing includes attenuating smaller propelling distance and direction change values of the signal indicating the locomotion of the bearer more than higher values thereof, and store a history concerning a most recently passed portion of the signal, in an unattenuated version, and/or the motion signals and to redo the analysis using a lower attenuation strength, on the basis of the history stored in case of realizing that the bearer starts a turn.

Another embodiment may have a non-transitory digital storage medium having a computer program stored thereon to perform the method for tracking a position of a bearer of a mobile device on the basis of one or more motion sensors comprised by the mobile device, the method having the steps of: based on motion signals gained from the one or more motion sensors, selecting one of a plurality of analysis parameter sets so as to obtain a selected analysis parameter set, by discriminating between different signal patterns associated with the analysis parameter sets; and analyzing the motion signals using the selected analysis parameter set so as to obtain a signal indicating a locomotion of the bearer, wherein the analyzing includes updating, on the basis of the signal indicating the locomotion of the bearer, a position signal indicating a position of the bearer, comparing the position signal with map data and/or discontinuously occurring registration signals indicating the mobile device's passing of any predetermined reference location so as to correct the position signal and obtain a correction signal and adjusting the selected analysis parameter set and/or bearer specific data used to perform the update of the position signal on the basis of the signal indicating the locomotion of the bearer, depending on the correction signal, when said computer program is run by a computer.

Another embodiment may have a non-transitory digital storage medium having a computer program stored thereon to perform the method for tracking a position of a bearer of a mobile device on the basis of one or more motion sensors comprised by the mobile device, the method having the steps of: based on motion signals gained from the one or more motion sensors, selecting one of a plurality of analysis parameter sets so as to obtain a selected analysis parameter set, by discriminating between different signal patterns associated with the analysis parameter sets; and analyzing the motion signals using the selected analysis parameter set so as to obtain a signal indicating a locomotion of the bearer, wherein the analyzing includes attenuating smaller propelling distance and direction change values of the signal indicating the locomotion of the bearer more than higher values thereof, and store a history concerning a most recently passed portion of the signal, in an unattenuated version, and/or the motion signals and to redo the analysis using a lower attenuation strength, on the basis of the history stored in case of realizing that the bearer starts a turn, when said computer program is run by a computer.

The present application is based on the finding that position tracking systems exploiting motion signals stemming from one or more motion sensors of a mobile device to track the position of the bearer of the mobile device, mostly suffer from discrepancies between laboratory conditions on the one hand and the real conditions on the other hand: mostly, the motion signals are inaccurate, especially if the mobile device is not a proprietary device, and one has to reckon that the bearer wears the mobile device somewhere else than where it is supposed to be worn in order to coincide with the laboratory conditions. However, the information conveyed by the motion signals is sufficient in order to discriminate and detect between different typical wearing/carrying conditions, and accordingly position tracking based on such motion signals may be rendered far more efficiently by, first of all, using the motion signals gained from the one or more motion sensors so as to attribute them to one of a plurality of analysis parameter sets so as to obtain a selected analysis parameter set and, second, analyzing the motion signals using the selected analysis parameter set so as to obtain a signal indicating a locomotion of the bearer.

In accordance with an embodiment, the attribution is performed by pattern recognition. For example, a best match between the motion signals on the one hand and a set of signal patterns on the other hand is searched for, with each of the set of signal patterns being associated with one of the analysis parameter sets. By this measure, the attribution is robust and relatively easy to perform. Moreover, the attribution may be updated continuously, thereby guaranteeing that the analysis of the motion signals is performed at the highest accuracy at any time.

In accordance with an embodiment, the motion signals are received from the one or more motion sensors via a sensor fusion module configured to perform sensor fusion on raw signals of the one or more motion signals such that a motion signal refers to a coordinate system vertically aligned. This renders the attribution easier. Beyond this, the attribution may be performed in a manner taking a currently determined locomotion heading direction into account such as, for example, orienting the aforementioned vertically aligned coordinate system so as to be aligned to the locomotion heading direction as well. This reduces even further the computational efforts for performing the attribution as well as the analysis.

In accordance with an embodiment, the analysis comprises mapping cycles of a cyclic component of the motion signals onto a discrete sequence of locomotion cycle descriptors each describing a measure for a propelling distance and direction change, wherein the mapping is controlled by the selected analysis parameter set and is different for different ones of the plurality of analysis parameter sets. In order to reduce the computational efforts for performing the mapping, contextual data may be taken into account, such as map data. By this measure, most probable bearer behaviors may be started with when performing the mapping, for example, in order to skip locomotion behaviors less probable in the current contextual situation in the case of any of the more probable ones already sufficiently fitting to the current motion data.

In accordance with a further aspect of the present application, minor values in the discrete sequence of locomotion cycle descriptors are attenuated so as to be insensitive against drift effects. However, a history concerning a most recently passed portion of the descriptor sequence and/or the motion signals prior to attenuation is stored so as to be able to redo the analysis and/or attenuation on the basis of this history in the case of realizing that the bearer started a maneuver such as a turn so that it is likely that the attenuation falsely cut-off the beginning of that maneuver. By this measure, the position tracking may be rendered more accurate as the position tracking is stabilized against drift affects while nevertheless exactly tracking curvatures in the bearer's locomotion path.

In accordance with an embodiment, a position signal indicating a position of the bearer as obtained by a continuous update on the basis of the locomotion signal, is compared with map data and/or continuously occurring registration signals indicating the mobile device's passing of any predetermined reference locations such as beacons, so as to correct the position signal and obtain a correction signal, wherein the correction signal is used to adjust the selected analysis parameter set and/or bearer specific data used to perform the update of the position signal on basis of the locomotion signal. Advantageously, the overhead for providing the external knowledge represented by the map data and/or continuously occurring registration signals is low. On the other hand, the achievable accuracy increase is high.

In accordance with an embodiment, exceptional measures are taken in case of a degree of matching of the motion signal with the signal patterns lying below, for all signal patterns, a predetermined threshold. For example, a self-learning motion cycle algorithm is then applied to a cyclic component of the motion signals so as to create a new analysis parameter set. The latter may be added to the plurality of already available analysis parameter sets along with a signal pattern which is representative of the cyclic component onto which the self-learning motion cycle algorithm has been applied. By this measure, personal, often recurring behaviors of the bearer in carrying the bearer's mobile device may be recognized and the position tracking concept may adapt itself to this bearer's personality.

BRIEF DESCRIPTION OF THE DRAWINGS

Embodiments of the present invention will be detailed subsequently referring to the appended drawings, in which.

DETAILED DESCRIPTION OF THE INVENTION

Before describing embodiments of the present application in detail, some general thoughts and considerations are set out which allow for a better understanding of the idea underlying, and the advantages provided by, the embodiments described hereinafter. Generally, however, it is noted that although the considerations set out below often focus on human bearers, the circumstance should not be treated as a hint that the present application was restricted to human bearers only. Rather, the present invention and its embodiments may be advantageously applied to any sort of bearer, including human beings as well as animals. Beyond this, instantiations of embodiments of the present application may either be specifically designed for the usage for a specific sort of bearer, such as humans or dogs, or may be designed for use by any of a plurality of different bearer types, as will be noted at the end of the description of the figures.

Figure 1:
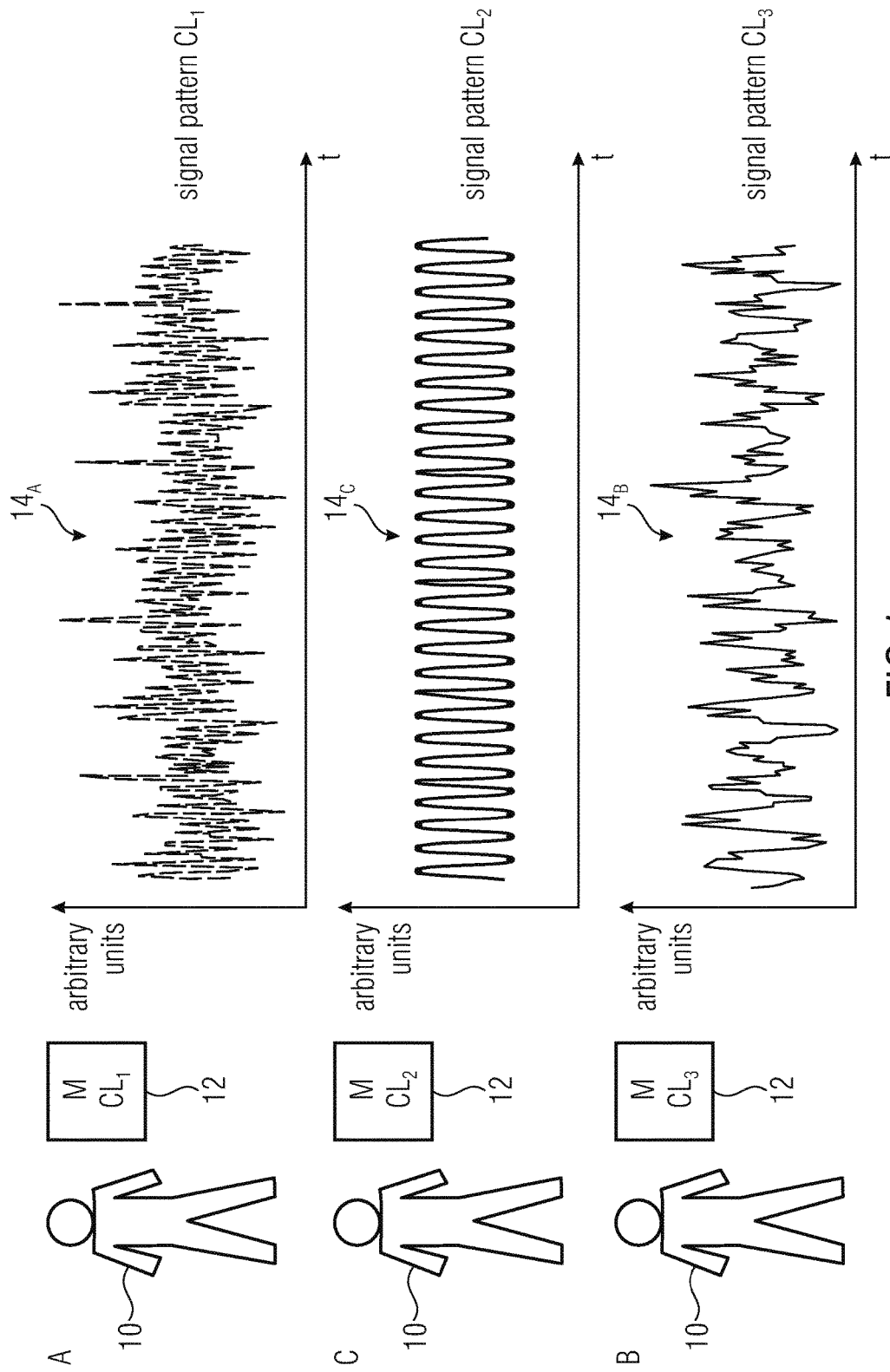
FIG. 1 schematically shows a bearer 10 carrying a mobile device 12 at three different carrying locations and, associated with the different carrying locations, examples for resulting motion signals, the motion signals showing different signal patterns depending on the carrying location.

Walking of humans, i.e. gait, has been analyzed in depth and various models have been developed, considering the human body biomechanics and the kinematics of several body segments and points. FIG. 1, for example, shows exemplarily three different scenarios A, B and C of a bearer 10 carrying a mobile device 12 with the scenarios differing in location where the mobile device 12 is worn/carried by the bearer 10. In the example of FIG. 1, the bearer is a human being. In situation A, the mobile device 12 is carried next to the bearer's ear, such as a mobile phone held by bearer 10 during phoning, in situation B the mobile device 12 is held in the hand, such as a mobile device during texting, dialing, etc., and in situation C the mobile device 12 is stored in a pocket of bearer 10, such as the trouser pockets of the bearer.

On the right hand side of the symbolizations of scenarios A to C, FIG. 1 shows a time-varying signal obtained on the basis of a mobile device's motion sensor in the respective scenario. For the time being, the motion signal $14_{A,B,C}$ thus obtained in scenario A, B and C, respectively, shall not be restricted to any kind of motion signal: it might be a signal measuring the motion, such as acceleration, along the mobile device's coordinate system, a signal measuring an acceleration along a direction fixed relative to an earth coordinate system, a signal measuring the absolute value of the three dimensional acceleration of the mobile device 12 or some other motion related signal. However, the interesting thing about signals $14_A$ to $14_C$ is that all of these signals show a specific signal pattern indicated as $CL_1$ to $CL_3$ on the right hand side of FIG. 1. As illustrated in FIG. 1, carrying mobile device 12 in the trouser pockets of the bearer, for example, tends to result in a more sinuous like, i.e. smoothly varying, signal, whereas the signals $14_A$ and $14_B$ in the other scenarios seem to deviate from this smooth behavior by an overlay of certain carrying location specific noise. As will become clear from the description brought forward below, embodiments of the present application seek to exploit the distinguishability of signals $14_A$ to $14_C$ in order to select one of several analysis parameter sets which may then more accurately be used in order to track the bearer's position using the motion sensor's signals of the mobile device.

In other words, FIG. 1 shows that depending on the bearer's behavior in carrying the mobile device, the motion signals obtained by the mobile device's motion sensor(s) deviate from the ones usually gathered in laboratory conditions, where the walking of humans has been thoroughly analyzed considering the human body biomechanics and kinematics. Typically, these models describe patterns of human body motions on the body center of mass near the lower end of the spine where motion can be described as a double pendulum model. However, this is an uncommon place to wear a mobile device in the case of a phone, for example. In contrast, a mobile phone is stored in a pocket, held in the hand for texting, dialing, etc., or held next to the hand while talking. The embodiments described further below do not suffer from this usual behavior of mobile device bearers.

Human gait refers to the locomotion caused by the alternate movement of legs and the alternate contact of each foot with the ground, i.e. the steps, so as to progress in a certain direction, i.e. the locomotion heading direction, which necessitates an efficient coordination of different body segments, including the legs and the arms. Motion of specific parts of the human body during walking is a consequence of the way different segments of the human body articulate to produce an efficient movement. Additionally, walking produces cyclic motion patterns which are repeated each time a step is taken. Motion data is captured by movement sensors of mobile device 12 in a certain location $CL_x$ of the corpus of bearer 10, which movement sensors, in turn, reproduce the cyclic movement patterns that correlate with a change in relative position of the bearer in a space each time a step is taken. Similar to the double pendulum motion described for the body center of mass, the legs, arms, trunk, etc. produce cyclic movement patterns as shown in FIG. 1, related to the movement of the legs produced to create movement, i.e. to change the corpus' position in a certain area.

On top, humans differ in size, weights, gender and age, which all has an impact on the way of walking and the related motions and resulting movement. Furthermore, while walking, and as humans are not machines, there is individual and specific patterns in the gait, caused by the different physiological conditions, e.g. anthropometric characteristics, measurements and proportions of the body, different types of footwear and even physiological factors, such as personality type and emotions. Additionally, often other people or other upcoming disturbances such as obstacles and uneven surfaces obstruct a direct path, causing a corrective reaction in the normal patterns of walk in an attempt to avoid the perturbation and maintain balance. All of this information not directly connected with the overall displacement of the human body, i.e. moving from one position to another, is to be considered signal noise, but being part of the pure sensor data that is provided by the motion detection sensors of the mobile device 12.

Similarly, the locomotion of other species is characterized by its own specificities, and also necessitates an efficient coordination between different body segments to progress in a certain direction. Motion data captured by motion detection sensors of a mobile device 12 in a certain location $CL_x$ produce cyclic patterns $14_A$ to $14_C$ related with the movement of the bearer's corpus. Each individual's motion patterns differ from other individuals of the same species, due to differences in their individual characteristics, such as size and weight. Also, environmental factors add specificity to the motion patterns when a certain corpus is moving, adding noise to the pure sensor data provided by motion sensors of the mobile device 12.

The solutions presented in the introductory portion of the specification of the present application often try to eliminate this type of noise by calculating trajectories and estimating from the past the movement and direction of the future. However, this is a cumbersome task and the achievable preciseness is nevertheless restricted.

The embodiments outlined below follow a very different approach. These embodiments use a concept which in the following is called "adaptive filtering". This adaptive filtering is applied to the motion sensor data of the motion sensor(s) of the mobile device in order to extract a signal indicating a locomotion of the bearer, also called pure movement data in the following. It is a parametric description of the bearer's locomotion consisting of locomotion cycle descriptors describing the bearer's self-propelling in terms of passed distance per locomotion cycle and directional change per such cycle, free of any non-propelling related movements of the bearer such as the movements of the arms and so forth, and free of any other noise sources.

Prior to describing embodiments of the present application, however, reference is made to FIG. 2 which shows a mobile device as an example of where embodiments described further below may be implemented, as well as environmental facilities which may be used in the embodiments described below in accordance with certain embodiments.

Figure 2:
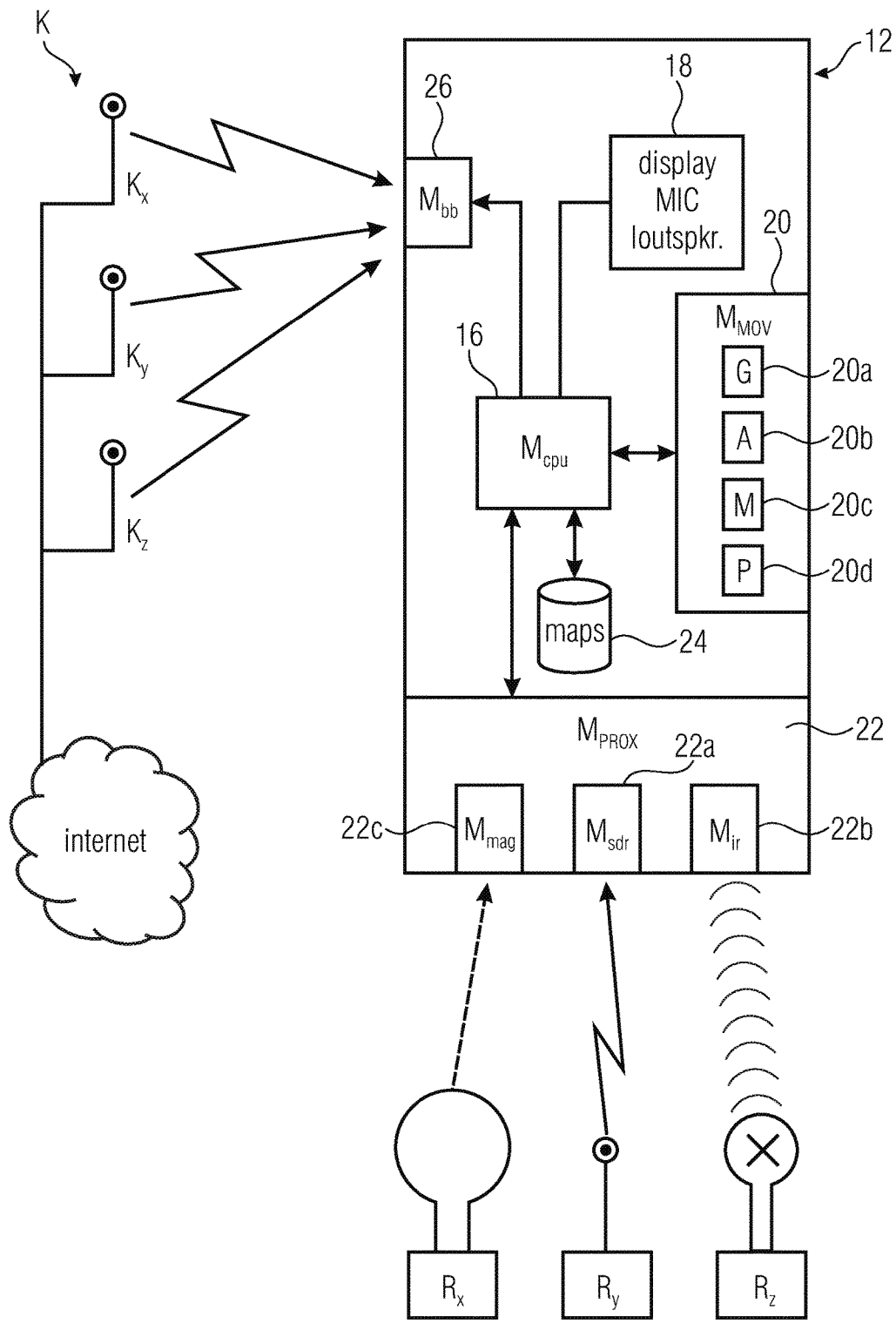
FIG. 2 shows a block diagram of a mobile device which may possibly use embodiments of the present application, along with an example for interacting infrastructure.

FIG. 2 shows a mobile device 12. It may be a mobile phone, such as a smartphone, or a PDA (Personal Digital Assistant), a media player, a digital camera, a smart watch or the like. The mobile device is shown as comprising a central processing unit 16 operationally connected to user input/output devices 18, such as a display, a speaker and/or a microphone, one or more motion sensors 20 and one or more proximity sensors 22 as well as a memory 24 and wireless I/O interface 26. Again, FIG. 2 is merely treated to be illustrative of an example of a mobile device carried by a bearer, the one or more motion sensors 20 of which are used to perform the position tracking further outlined below and accordingly all elements but the one or more motion sensors 20 are in principle optional as far as the position tracking embodiments described further below are concerned. Nevertheless, examples for the various elements shown in FIG. 2 shall be briefly presented. For example, the wireless I/O interface 26 may be a GSM or other RF interface or an interface for local communication, such as a WiFi interface. One of the examples of a proximity sensor 22, namely 22a, is also a wireless I/O interface. The difference between interfaces 22a and 26 shall be the communication range or maximum distance between mobile device 12 on the one hand and base station acting as counterpart of the respective I/O interface 26 and 22a, respectively, on the other hand still allowing the reception of the base stations signal by the interface 22a and 26, respectively. FIG. 2 shows, for example, three exemplary transmission nodes or base stations $K_x$, $K_y$, $K_z$ of a communication network K, here exemplarily coupled to the internet, configured to communicate with the wireless I/O interface 26, and exemplarily one base station $R_y$ for communicating with mobile device 12 via I/O interface 22a. The maximum distance still allowing communication (or at least reception at the mobile device) is higher for interface 26 than for interface 22a. The I/O interface 22a may, for example be a Bluetooth, ZigBee, Z-Wave, ANT or another interface. In principle, proximity sensor 22a does not need to be able to send data, and accordingly, node $R_y$ need not to be able to receive data. Rather, proximity sensor 22a is seen as a representative of a sensor being able to receive RF data sent-out by a base station $R_y$ which, thus, serves as a beacon having a predetermined reference position and allowing for position determination as will be outlined in more detail below.

Further examples for proximity sensors are also shown in FIG. 2: an optical sensor 22b may be able to receive optical signals, i.e. optical beacon signals, sent out by one or more base stations, i.e. optical beacons, $R_z$. Proximity sensor 22b may be infrared-based and may, inter alias, be able to perform optical communication mobile device 12 and the one or more mobile stations $R_z$.

A further example of a proximity sensor is shown using reference sign 22c: a magnetic sensor 22c detects an overlay of the natural magnetic field with an artificial one generated using one or more magnetic field generators $R_x$, each, thus, acting as a kind of "magnetic beacon". Reference is made, for example, to WO 2012059542 assigned to the same applicant as the present application, for further details regarding exploiting a "magnetic beacon" for detecting the position of a mobile device.

As also shown in FIG. 2, memory 24 may have stored therein map data including, for example, a map of some indoor site, such as, for example, a supermarket. The map data stored in memory 24 could also comprise data enabling locating a certain beacon's position. Alternatively, each beacon $R_x$ to $R_z$ sends out its reference position in a manner contained within the beacon it sends out. As far as the one or more motion sensors 20 are concerned, FIG. 2 shows that the same may possibly comprise one or more gyroscopes 20a, one or more accelerometers 20b, one or more magneto meters 20c and/or an air-pressure sensor 20d (for measuring elevation changes). For example, the gyroscope 20a measures, based on the principles of angular momentum, an orientation of the mobile device 12 relative to mobile device's coordinates, for example, or an orientation change. The accelerometer 20b, for example, measures the mobile device's 12 acceleration/motion. The magnetometer measures the magnetic field, such as magnetic strength and/or direction of the magnetic field at the position of mobile device 12. In fact, magnetic sensor 20c and proximity sensor 22c may coincide or may largely co-use one or more components. Air-pressure module 20d measures the air pressure the measuring signal of which may be used to measure elevation changes of the wearer.

Up to now, the description of FIG. 2 focused on the hardware of mobile device 12. Many of the tasks described so far, however, may be partially shifted from the respective components described so far to processing unit 16. In other words, each of elements 26, 22c, 22a, 22b, 20d, 20c, 20b, 20a and 18 may have one or more software components which run on processing unit 16. This may be true, for example, for protocols associated with any of the I/O interfaces and filters or recognition algorithms used for detecting beacon signals.

Figure 3:
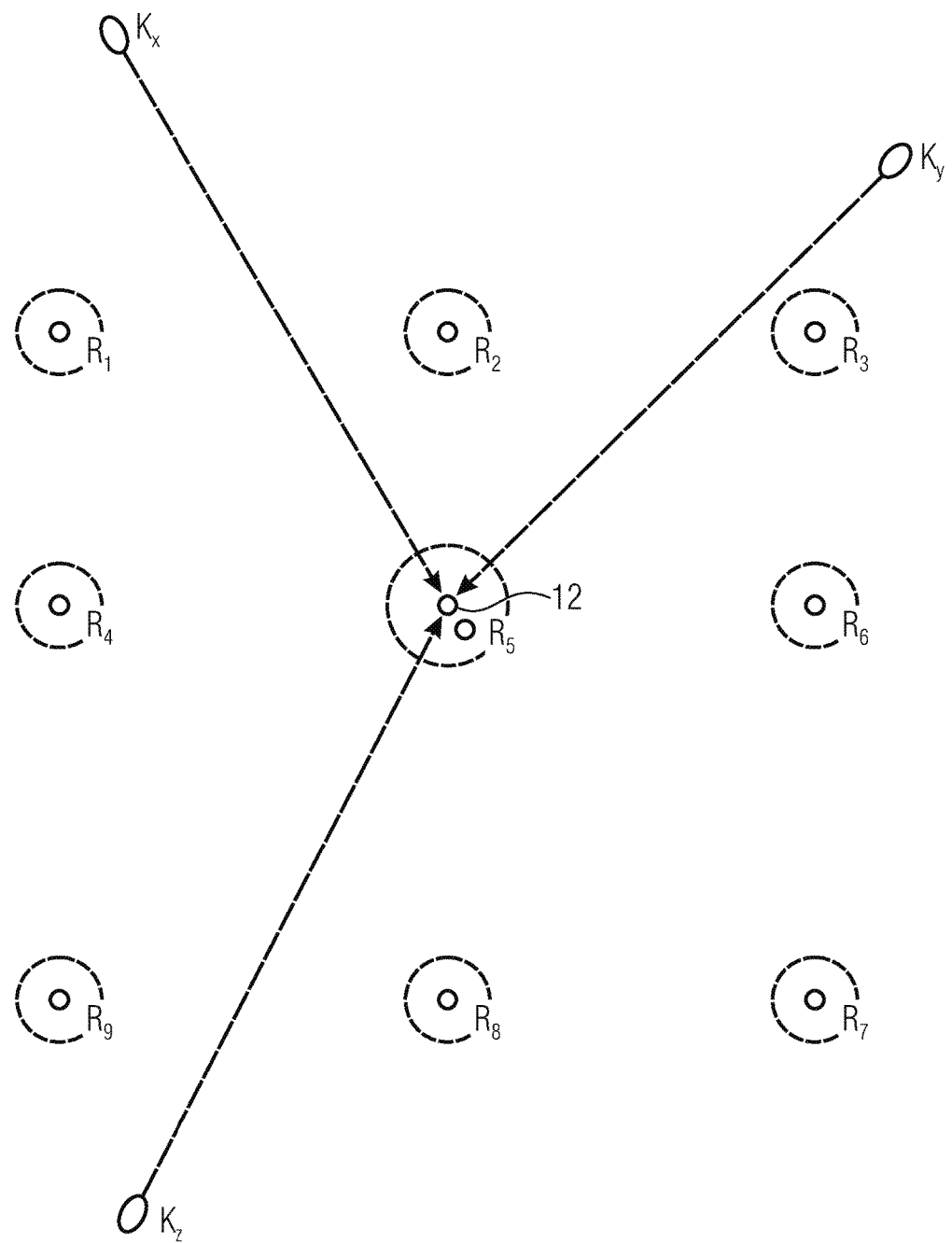
FIG. 3 shows a schematic diagram of an infrastructure in which a mobile device 12 is carried by a bearer so as to illustrate advantages resulting from embodiments of the present application.

FIG. 3 exemplarily shows mobile device 12 worn or carried by a bearer (not shown in FIG. 3) within an infrastructure comprising several beacons R distributed within the area of the infrastructure, such as an indoor area representing, for example, a supermarket or the like. Each beacon $R_1$ to $R_9$ is shown surrounded by its beacon signal reach illustrated by dashed lines, surrounding the individual beacon's reference positions, and as may be seen from FIG. 3, the area within which the bearer may travel within the infrastructure is merely sparsely covered by the beacon signal areas of the beacons $R_1$ to $R_9$. "Beacon signal areas" shall determine the area within which the beacon signal of a certain beacon is detectable via any of the one or more proximity sensors of mobile device 12. In the area between the beacons $R_1$ to $R_9$, outside their beacon signal areas, the embodiments outlined further below track the bearer's position using the motion signals of the one or more motion sensors 20 of mobile device 12. That is, as soon as mobile device 12 leaves any of the beacon areas, position tracking solely relies on the subsequently explained embodiments and the accuracy and the position tracking decreases monotonically until the bearer of mobile device 12 passes any of beacons $R_1$ to $R_9$, again. Nevertheless, the accuracy in tracking the mobile device's 12 bearer as achievable by the subsequently explained embodiments is quite high, and the infrastructure overhead concerning the beacons $R_1$ to $R_9$, which are optional in accordance with some embodiments of the present application anyway, is quite low compared to alternatives using, for example, triangulation on the basis of larger distance beacon signals output, for example, by base stations $K_x$, $K_y$ and $K_z$, which are shown in FIG. 3 for illustration purposes only and may not be comprised by the infrastructure. In other words, triangulation positioning systems would necessitate the installation of base stations like those exemplarily shown in FIG. 3. Beyond this, additional measures would have to be tackled if the line of sight between these base stations $K_x$ to $K_z$ would be blocked by obstacles like walls and the like. Either the achievable accuracy in determining the position by means of triangulation would have to be accepted as being low, or the density of base stations $K_{x-z}$ would have to be increased. In accordance with the embodiments outlined further below, this is not a problem. No special requirements have to be imposed onto the proximity beacons $R_1$ to $R_9$: they merely serve as an optional means for intermittently checking the correctness, and actually correcting, the position as determined as outlined below, and as an optional means for increasing the accuracy of future position tracking by appropriately adjusting internal parameters depending on realized deviations between the estimated position determined solely based on the motion signals between two beacons passed by the bearer, as further outlined below, and the actual relative positions of these two beacons on the other hand.

FIG. 3, just like FIGS. 1 and 2, was meant to ease the understanding of the advantages and thoughts underlying the embodiments outlined further below, but it should be noted that in accordance with some embodiments of the present application, no beacons are necessitated at all. Rather, all of the embodiments outlined further below are, beyond the advantages when used in concert with an infrastructure as illustrated in FIG. 3, comprising beacons, advantageous in that the position tracking is performed in a manner allowing high accuracy over a pretty far path length covered by the bearer of mobile device 12.

In particular, the embodiment further outlined below follows an approach based on adaptive filtering technology applied to motion sensor data of motion sensors of a mobile device in order to extract so called pure movement data. In accordance with an embodiment, the remaining error is periodically removed by a calibration mechanism which uses the reference points in the form of beacons or beacon signals which are detected by proximity sensors. Alternatively or additionally, meta information in electronic maps is used for performing calibration tasks. For example, the knowledge is exploited that a bearer is normally not able to pass through a wall or the like.

Figure 4:
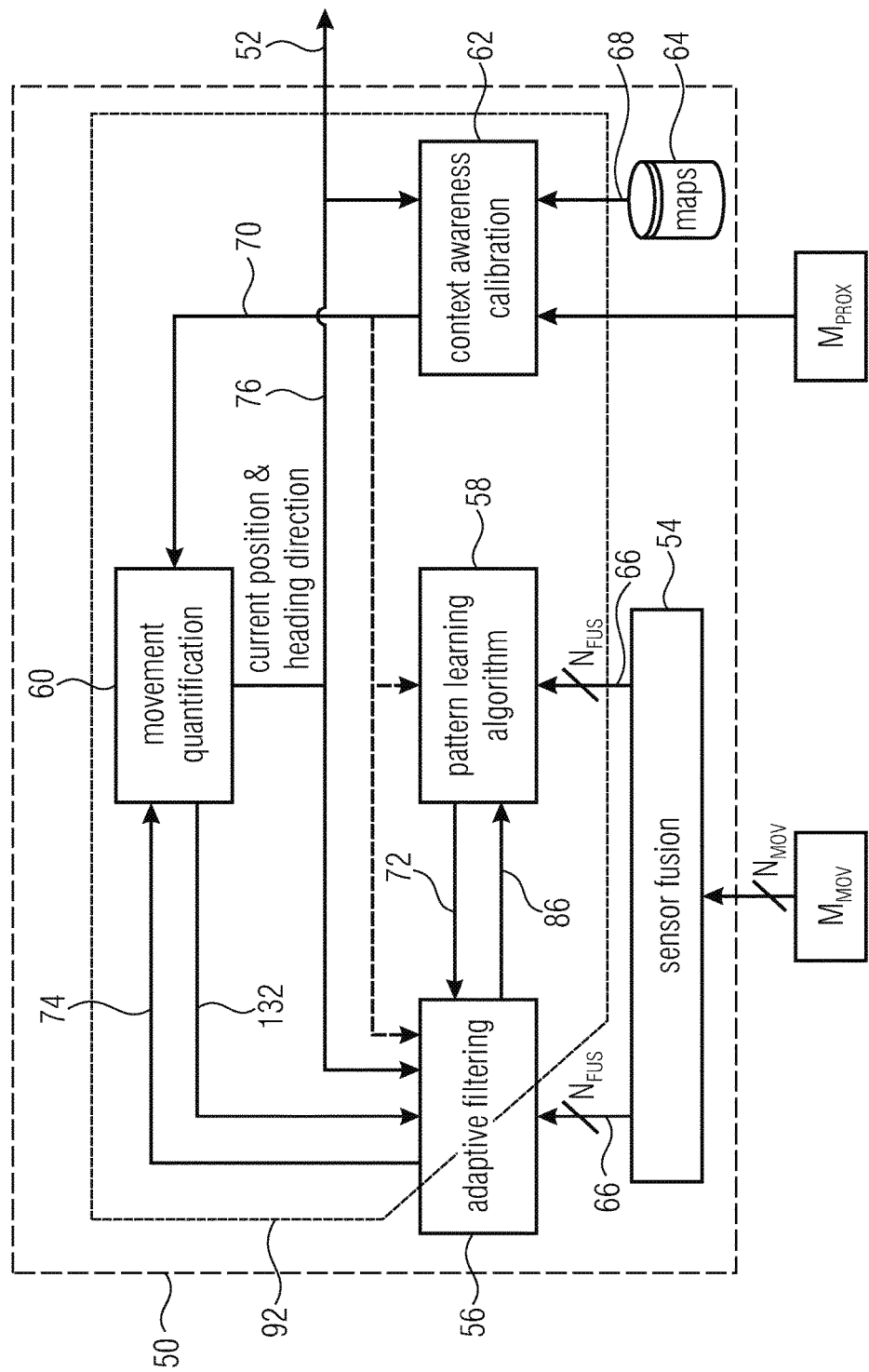
FIG. 4 shows a block diagram of an apparatus for tracking a position of a bearer of a mobile device in accordance with an embodiment.

FIG. 4 shows a block diagram of an embodiment of an apparatus for tracking a position of a bearer of a mobile device on the basis of motion signals of one or more motion sensors of the mobile device. It is noted that the apparatus shown in FIG. 4, which is generally indicated using reference sign 50 may run on the aforementioned processing unit 16 shown in FIG. 2. For example, the apparatus 50 may be implemented as software running on a processing unit. This processing unit may be the processing unit 16 of the mobile device 12 carried by the bearer, the position of which shall be tracked. It should be noted, however, that in accordance with an alternative embodiment, apparatus 50 may even be partially or completely implemented external to the mobile device. For example, via wireless data connections, all of, or some of, the components further described below may be implemented, i.e. their functions may be performed, external to the mobile device.

FIG. 4 shows apparatus 50 as comprising two inputs, one for receiving motion signals $M_{MOV}$ from one or more motion sensors of the mobile device and one input for receiving the signals of one or more proximity sensors, called $M_{PROX}$. Beyond this, at an output 52 of apparatus 50, the apparatus 50 provides information on the position of the bearer of the mobile device as tracked.

Internally, the apparatus 50 comprises the following components. Some of the components outlined below are optional and may be, accordingly, left out in accordance with alternative embodiments. However, for the time being, all elements of apparatus 50 shown in FIG. 4 and further specified in the subsequent figures are described, and afterwards possible alternatives to the complete description are indicated.

Apparatus 50 of FIG. 4 comprises a sensor fusion module 54, an adaptive filter 56, a pattern learning algorithm 58, a movement quantifier 60, a context awareness calibrator 62 and a storage 64. Sensor fusion module 54 receives the motion signals $M_{MOV}$ and outputs so called fused data 66 to adaptive filter 56 and pattern learning module 58, respectively. Context awareness calibrator 62, likewise, receives from outside, signals $M_{PROX}$ from the proximity sensor and has an input for receiving map data 68 from storage 64, and an output for outputting contextual data 70, the meaning of which is outlined in more detail below.

The pattern learning module 58 receives the fused data 66 and optionally the contextual data 70 and outputs a learned analysis parameter set 72, as a kind of fallback position as will be outlined in more detail below, to adaptive filter 56. Adaptive filter 56 uses fused data 66 and, as a fallback position, the learned analysis parameter set 72, to obtain a signal indicating a locomotion of the bearer, called pure movement data in the following and indicated using reference sign 74. As shown in FIG. 4, adaptive filter 56 may optionally also use the contextual data 70, details in this regard are described further below. The movement quantifier 60 receives the pure movement data 74 as well as the contextual data 70 and determines in a manner outlined in more detail below a signal 76 indicating the bearer's current position and locomotion heading direction, which signal is in turn used by adaptive filter 56 as well as context awareness calibrator 62, and beyond that is output at output 52.

Figure 5:
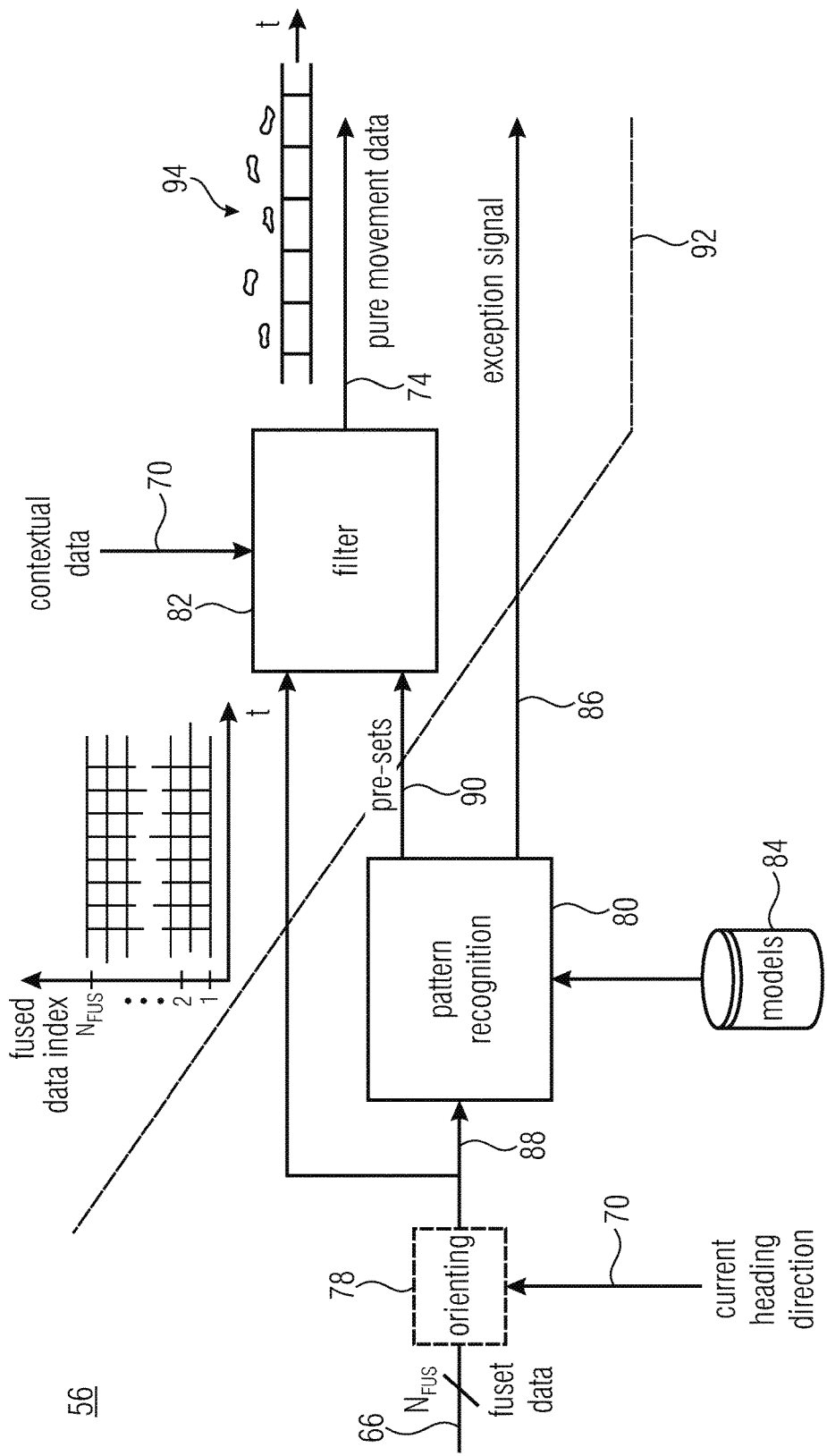
FIG. 5 shows a block diagram of the adaptive filter of FIG. 4 in accordance with an embodiment.

Before starting with the description of the mode of operation of apparatus 50, the internal structure of adaptive filter 56 is further explained with respect to FIG. 5. FIG. 5 shows the adaptive filter 56 as exemplarily comprising an orienting stage 78 and further comprising a pattern recognizer 80, filter 82 and a model storage 84. Orienting module 78, pattern recognizer 80 and filter 82 are, in the order of their mentioning, serially connected between the sensor fusion module and the movement quantifier, wherein a further input of filter 82 is directly connected to the output of sensor fusion 54, optionally via orienting module 78. The pattern recognizer 80 has access to the model storage 84, and as further shown in FIG. 5, pattern recognizer 80 is configured to send-out an exception signal which is, as shown in FIG. 4, received by pattern learning module 58 and indicated using reference sign 86.

If present, orienting model 78 turns the fused data 66 into data defined in a bearer specific coordinate system having the access vertically aligned and aligned with the bearer's heading direction. The thus obtained oriented fused data is indicated using reference sign 88. As further outlined below, pattern recognizer 80 selects, based on an analysis of the inbound data 88, one of several analysis parameter sets stored in storage 84 and outputs the selected one 90 to filter 82.

Although some of the elements shown in FIGS. 4 and 5 will be further shown in more detail in some of the following figures, its appears worthwhile to start describing the mode of operation of apparatus 50. In particular, from a general point of view, apparatus 50 is composed of a discriminator and an analyzer, wherein the task of the discriminator is to attribute motion signals gained from the one or more motion sensors of the mobile device to one of a plurality of analysis parameter sets so as to obtain a selected analysis parameter set, while the analyzer is configured to analyze the motion signals using the selected analysis parameter set so as to obtain a signal indicating a locomotion of the bearer. The pattern recognizer 80 assumes the task of the discriminator, while filter 82—here in concert with elements 60, 58 and 62—assumes the task of analyzer 92.

In the description set out below, it is assumed that apparatus 50 is continuously operated, so that, for example, signal 76 indicates the current position and heading direction of the bearer of the mobile device from the one or more motion sensors, which the motion signals $M_{MOV}$ stem from. It is recalled, however, that the current position and the modeling direction indicated by signal 76 could, in accordance with a simple example, be default values used whenever apparatus 50 starts operating.

The inbound motion signal is, as already explained above with respect to FIG. 2, for example, a vector of time-varying components $x_{raw,i}(t)$ with i=1 ... $N_{MOV}$, i.e.

$$M_{MOV}=(x_{raw,1}(t), x_{raw,2}(t), \ldots, x_{raw,N_{MOV}}(t))^T,$$

with t denoting time. The individual components may be, as already noted above, scalar output signals measuring the motion such as acceleration, rotation or rotation change, of/at the mobile device along any of mobile device specific coordinates, and, optionally, the gravity and/or magnetic field along any of mobile device specific coordinates.

The task of the sensor fusion module 54 is to "condense" the motion sensor's signals in $M_{MOV}$ to obtain the fused signal 66 also being a vector of component signals $x_{FUS,i}(t)$ varying in time t and each measuring, for example, the motion such as the acceleration and/or rotation or rotation change, of the mobile device along an axis of a coordinate system which is, by means of the sensor fusion performed by module 54, transformed from the mobile specific coordinate system to a global coordinate system being, for example, vertically aligned, i.e. having one axis aligned to the vertical or gravitational direction while the other axis of this coordinate system are, for example, aligned to east/west direction and north/south direction, respectively. That is, fused data 66 may be written as $$M_{MOV}=(x_{FUS,1}(t), x_{FUS,2}(t), \ldots, x_{FUS,N_{FUS}}(t))^T,$$

wherein the number of components of this vector, namely $N_{FUS}$, is for example equal to or smaller than $N_{MOV}$.

Another task of the sensor fusion module 54 may be to, in mapping time-varying raw signals $M_{MOV}$ onto the vector of time-varying signals $x_{FUS,i}(t)$, seek to optimize a quality or accuracy of the signal $x_{FUS,i}(t)$ by exploiting, for example, redundancies among the raw signals in that unreliable and/or noisy raw signals are substituted by less unreliable and/or less noisy ones. In other words, the pure sensor data $M_{MOV}$ provided by motion sensors of the mobile device is considered by sensor fusion module 54 as a whole and combined, thereby taking advantage of the best of each sensor such as, for example, the one or more accelerometer 20a, the one or more gyroscope 20b, the one or more magnetometer 20c and/or the one or more air-pressure sensor 20d as shown in FIG. 2. In other words, sensor fusion module 54 applies a filtering technique to the inbound raw data $M_{MOV}$ as acquired by the motion sensors, to extract more and more accurate information about movement of the mobile device, including the orientation of the mobile device relative to the earth coordinate system and additionally movement data in the earth coordinate system. For example, sensor fusion module 54 operates such, that regardless of the mobile device's orientation, it is feasible to obtain from fused data 66, for example, the motion data produced in the vertical direction, i.e. the direction of gravity, or in the horizontal direction, i.e. parallel to the ground. In other words, one of the time-varying component signals output by sensor fusion module 54, may for example indicate the mobile device's movement along vertical direction, and further of the time varying component signals may indicate the mobile device's movement along two axes being perpendicular to the vertical direction and perpendicular to each other. Such directions cover all of the possibilities for the relative displacement of a bearer, such as, for example, moving on top of horizontal surfaces, slopes or even moving between different altitude levels, such as different floors in a building.

The fused movement data obtained by sensor fusion module 54 as just outlined, enters, as seen in FIG. 4, adaptive filter 56 as well as pattern learning module 58. The task of the adaptive filter 56 is to extract from the inbound movement data 66 a signal 74 parametrically describing the locomotion of the bearer in units of cycles of the sequence of movements of the bearer. Imagine, for example, that the bearer is a human being. In that case, signal 74 may parametrically describe the bearer's locomotion progress in units of individual steps as symbolized in FIG. 5 at 94 using footprints. The "parametric description" is coarse in that same does not describe non-propelling related movements of the bearer. Rather merely the bearer's general propelling distance and direction change per locomotion cycle is described. However, it is recalled that the present invention is not restricted to this mode of operation. Almost any creature uses a certain sequence of movements for locomotion, which sequence of movements is cyclic in nature and is potentially itself subdivided into sub-cycles. Imagine, for example, a horse: depending on the horses gait, a whole cycle of the gait may consist of two, three or four beats. However, the present invention is also not restricted to creatures having legs with signal 74 parametrically describing the distance and direction of the steps thereof. Rather, any kind of locomotion may be described by signal 74, such as swimming, flying or the like.

The actual task of adaptive filter 56 is assumed by filter 82 shown in FIG. 5, but filter 82 is assisted and controlled by pattern recognizer 80 and optionally orienting module 78. Orienting module 78 may, for example, use the current heading direction 70 to apply another coordinate transformation onto the inbound fused data 66. For example, the orienting module 78 adjusts the time-varying component signals of the inbound fused data 66 so that same describes the movement of the mobile device in a coordinate system which is turned around the vertical axis such that the components of the resulting oriented fused data 88 describe the movement in a coordinate system having one axis oriented along the vertical, another axis oriented along the current bearer's heading direction, and an even further axis oriented along a transversal direction perpendicular to both other directions. Thus, the oriented fused data 88 may be described as $$M_{MOV} = (x'_{FUS,1}(t), x'_{FUS,2}(t), \ldots, x'_{FUS,N_{FUS}}(t))^T,$$

Pattern recognizer 80 assists and improves the mode of operation of filter 82. Pattern recognizer 80 exploits the observation outlined above with respect to FIG. 1: depending on the location where the bearer currently carries the mobile device, the inbound movement signal entering pattern recognizer 80 as well as filter 82, looks different and needs different interpretation so as to be mapped onto the parametric representation of signal 74. Accordingly, pattern recognizer 80 distinguishes between different "looks" of the inbound motion signal 88. For example, model storage 84 stores, for each of a plurality of models, a selected analysis parameter set and, associated therewith, a signal pattern. By pattern recognition, pattern recognizer 80 compares the inbound motion signals 88 with the models' signal patterns. For example, correlation may be used in order to perform the comparison between the inbound motion signals 88 and each of the models' signal patterns. Pattern recognizer 80 may, by this end, search for a best match between the motion signal 88 on the one hand and the signal patterns on the other hand, the best match corresponding, for example, with the highest correlation. The pattern recognizer 80 selects the model, the signal pattern of which results in the best match with the inbound motion signal 88. It should be clear that the pattern recognition performed by pattern recognizer 80 does not necessarily involve all components of the inbound motion signal 88. Rather, merely one or a combination of its components may be involved in the discrimination between the different signal patterns associated with the various models stored in storage 84. In any case, pattern recognizer 80 selects the model leading to the best match and forwards the selected analysis parameter set to filter 82, the mode of operation of which is described next. It should briefly noted here that the recognizer 80 may continuously or intermittently repeat, or check the validity of, the comparison thus performed so as to keep the selection up-dated and adapted to the current scenario of the bearer carrying the mobile device.

Figure 6:
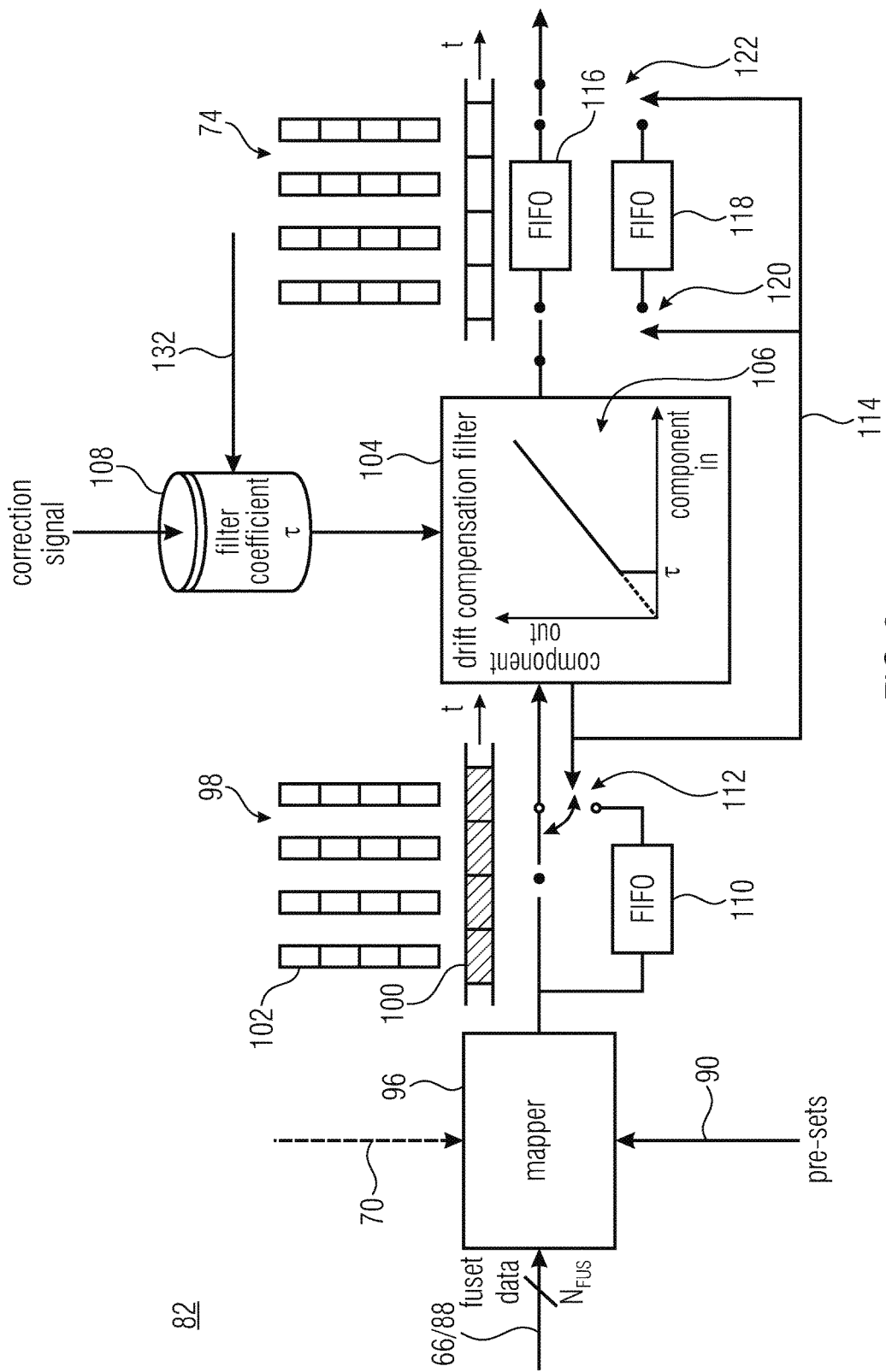
FIG. 6 shows a block diagram of the filter of FIG. 5 in accordance with an embodiment.

FIG. 6 shows the internal structure of filter 82 in more detail. As shown, filter 82 may comprise a mapper 96 configured to receive the fused data 66/88 and the selected analysis parameter set 90 and to map the motion information contained within the fused data onto a discrete sequence 98 of locomotion cycle descriptors 100 each describing a measure for a propelling distance and direction change, wherein the mapping is controlled by the selected analysis parameter set 90 and is different for different ones of the analysis parameter sets associated with the different models stored in model storage 84. For example, each locomotion cycle descriptor 100 describes one step, one wing flap, one flipper flap or the like of the bearer. Each descriptor 100 may describe the individual locomotion cycle, i.e. step, wing flap or the like, using individual parameters including, for example, a measure for the travel distance, a measure for the bearer's directional travel change and optionally a measure for the bearer's travel elevation change. The descriptors are, in particular, free of time-resolved parameters. They merely describe the propelling contribution of the respective locomotion cycle to the bearer's overall locomotion path to be tracked. The "measure" of the descriptors 100, especially as far as the travel distance is concerned, may not yet have been scaled to its final version, i.e. be measured in arbitrary units. The measure concerning the bearer's directional change, i.e. to the left or right, may be, for example, given in angular domain or in spatial domain, i.e. indicating the movement to the right or or to the left relative to the locomotion heading direction per the travel distance of the respective descriptor 100. The parameter values of descriptors 100 are illustrated in FIG. 6 using small boxes 102. They may be interval-scaled. The order at which the sequence 98 of descriptors 100 is output by mapper 96 follows the sequence of locomotion cycles of the bearer.

The way the analysis parameter set 90 controls mapper 96 may be as follows: the mapper 96 exploits the fact that the locomotion cycles of the bearer manifest themselves in the inbound fused motion data. As explained, however, with respect to FIG. 1, depending on the way the bearer carries the mobile device, the inbound fused motion data is a different overlay of cyclic components attributed to the bearers sequence of movements and the selected analysis parameter set 90 enables mapper 96 to extract from the inbound fused motion data that cyclic component which is the best hint for describing the propelling direction change and distance which the bearer took at the respective locomotion cycle. Manifold implementation possibilities exist for mapper 96. For example, the inbound selected analysis parameter set 90 (as well as all of the other analysis parameter sets stored in storage 94) could each comprise a set of predefined signal patterns each associated with a different propelling distance and propelling directional change and the mapper 96 is configured to search for a best fit between those patterns and the inbound fused motion data, optionally using interpolation, in order to obtain descriptors 100. As the analysis parameter sets in model storage 84 are specific for the various possibilities of how the bearer carries the mobile device, the selection performed by pattern recognizer 80 extremely increase the accuracy of the mapping performed by mapper 96. Even alternatively, the set of predefined signal patterns are associated with different propelling distances at straight forward locomotion direction only, and the locomotion heading direction change is obtained differently such as by way of integrating respective ones of the fused data components signals during the respective locomotion cycle.

When stringing together the locomotion cycles described by descriptors 100, one obtains an information on a path taken by the bearer. That is, the sequence 98 is a signal indicating a locomotion of the bearer. However, for various reasons, it is advantageous to subject the sequence 98 to a filtering in order to compensate for drift in the sequence 98. Accordingly, filter 82 further comprises a drift compensation filter 104 configured to receive the sequence 98 from mapper 96 and to subject minor or small values 102 of descriptors 100 to attenuation. For example, for one or more or even all of the parameters 102 of descriptors 100, drift compensation filter 104 may set values being smaller than a predetermined threshold T to 0, as illustrated at 106 in FIG. 6, wherein the threshold T may be parameter 102 specific. By this measure, drifts otherwise degrading the accuracy of sequence 98 are removed. These drifts may stem, for example, from nonlinearity or clipping effects resulting from, for example, the mobile device steadily knocking at the bearer's body or the like. In particular, the direction at which these sensor deficiencies occur may be un-equalized, i.e. there may be a predominate direction at which the used movement data shows nonlinearity or clipping artifacts. This, in turn, may result in, for example, descriptors 100 comprising a steady small movement component suggesting a slight left turn, slight right turn of the bearer or suggesting that the bearer moves faster or slower than he/she actually does. Other drifts are possible as well: even if the motion sensors were free of any deficiency, humans, for example, tend to swing between the individual steps using the right and left legs, respectively. In order to prevent these swings from manifesting themselves in the position tracking as slight, alternate turns to the right and to the left, drift compensation filter 104 blocks the minor or small values of descriptors 100. As already mentioned, the cut-off threshold value T may be different, for example, for the different parameters 102 of descriptors 100, such as for the propelling distance and the propelling directional change, and there may even be two cutoff values for one or more of parameters 102, thereby defining an interval between which values 102 are set to 0. Instead of setting to zero, another attenuated. These thresholds T are examples for filter coefficients controlling the drift compensation filter 104 and FIG. 6 exemplarily shows a filter coefficients storage 108 storing the filter coefficients.

Accordingly, at the output of filter 104, the sequence 98 results in a filtered version and represents the pure movement data or signal 74, which finally enters the movement quantizer 60 (FIG. 4).

FIG. 6 shows further details which are present in accordance with the present embodiment, which however may be left out in accordance with an alternative embodiment. As shown in FIG. 6, a memory 110, such as an FIFO (First In First Out) storage, may be present in order to buffer a history concerning a most recently passed portion of sequence 98. The input of storage 110 is connected to the output of mapper 96, and a switch 112 connects one of the mapper's 96 output and the memory's 110 output with the input of drift compensation filter 104. As will be described in more detail below with respect to FIG. 8, the buffering by buffer 110 enables redoing the compensation/filtering performed by filter 104 for a certain period of time in order to redo those compensations/this filtering with regard to the most recently past history which actually belongs to the real start of an intended term by the bearer. In other words, while the mode of operation of filter 104 generally increases the accuracy of the position tracking of the bearer, the filter's 104 functionality degrades the position tracking in case of the beginnings of real intended turns by the bearer, because in that case, filter 104 accidentally cuts away the intended maneuver by the bearer, i.e. the filter 104 accidentally prevented these maneuvers from manifesting themselves in signal 74. Accordingly, whenever filter 104 determines the beginning of such a maneuver by the bearer, such as an intended turn to the left or to the right, filter 104 outputs a "replay signal" 114 to switch 112 in order to obtain the most recent portion of sequence 98 again and to subject this portion to the filtering again, this time however without performing, or with less severe performing, the drift compensation. In order to replace the corresponding portion in the output sequence 74 of filter 104, FIG. 6 shows two memories such as FIFO storages 116 and 118 connected in parallel with two switches 120 and 122 being arranged at their inputs and outputs, respectively.

Switches 120 and 122 are also controlled by signal 114: whenever backward-correction is indicated by signal 114, switches 120 and 122 cut-out the portion of signals 74 corresponding to the history reinserted to filter 104, and plays out the reprocessed portion input again into filter 104, as obtained at the output of filter 112. Instead of completely leaving the reprocessed portion unfiltered, versions in between are feasible as well. That is, reprocessed portions may, for example, be less attenuated when compared to the processing the first time.

Figure 7:
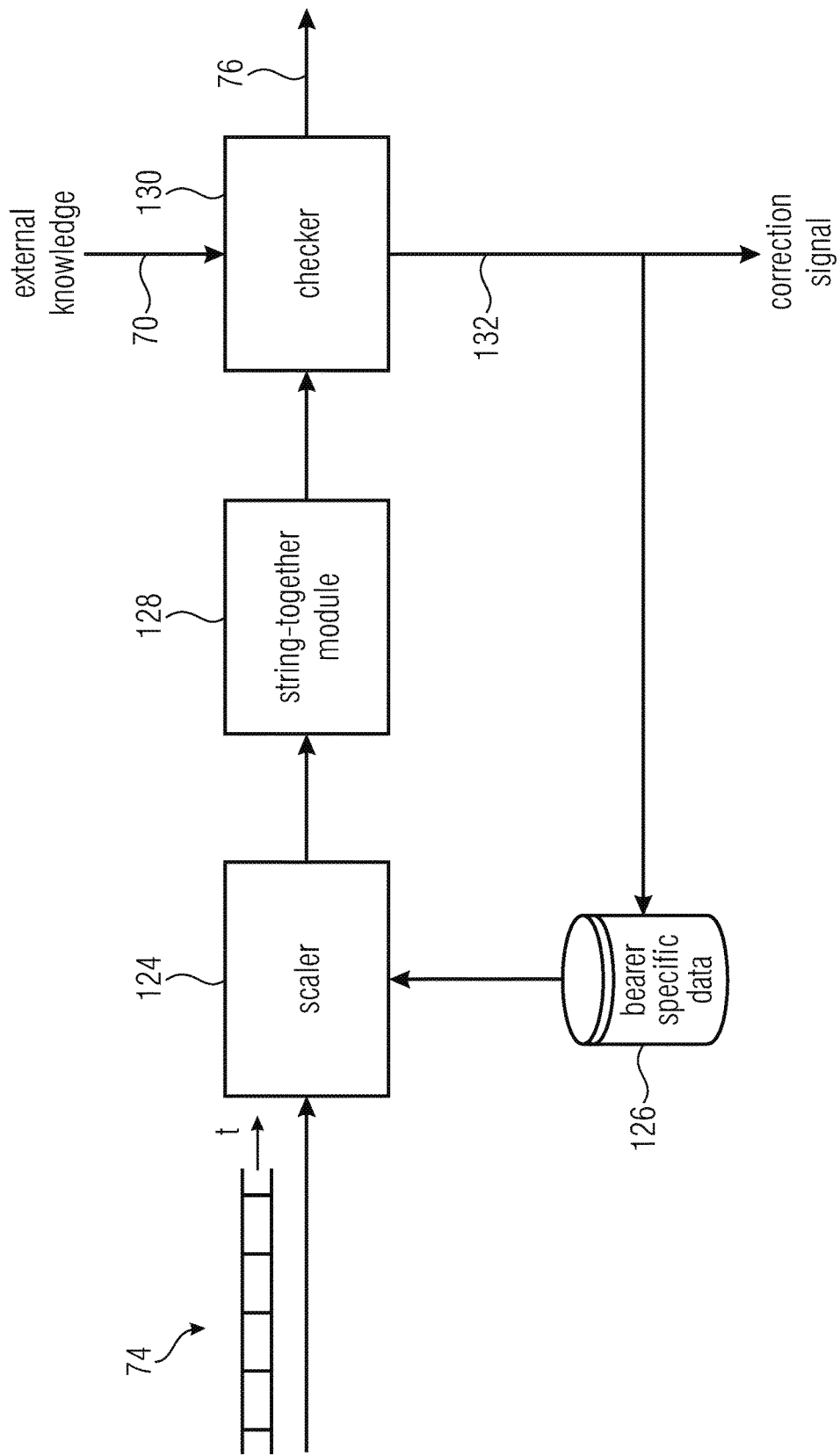
FIG. 7 shows a block diagram of the movement quantifier of FIG. 4 in accordance with an embodiment.

Before proceeding with the description of the movement quantifier 60, the internal structure of which is described in more detail with respect to FIG. 7 in the following, it is noted that instead of inputting the buffered history in memory 110 into filter 104 again, this portion may, in case of an exception instance being signaled by signal 114, be bypassed past filter 104, to directly substitute the corresponding cut-out portion of the output descriptor sequence 74.

As already mentioned above, signal 74 enters the movement quantifier 60 in an arbitrarily scaled version. This means the following: due to bearer specific measures, such as the leg length and so forth, a "normal step" may differ from bearer to bearer (in the instance of human bearers). The movement quantifier 60 is responsible for taking these bearer specific measures into account in order to increase the accuracy of the position tracking as far as possible. As shown in FIG. 7, the movement quantifier 60 may comprise a scaler 124, a bearer specific data storage 126 coupled to scaler 124, a string-together module 128 and a checker 130, wherein string-together module 128 is connected between scaler 124 and checker 130. Scaler 124 receives a signal 74, i.e. the sequence of descriptors, and scales the parameter values of the descriptors according to bearer specific data stored in storage 126, such as for example a bearer specific step or leg length or, more generally, a bearer specific cycle propelling distance for scaling the respective propelling distance parameter of the descriptors of sequence 74, and optionally scales propelling directional change parameters of the descriptors or elevation change parameters of the descriptors using respective other bearer specific data. Please note that a non-linear scaling may be feasible as well.

The string-together module 128 simply strings together the sequence of scaled descriptors so as to obtain and track the path passed by the bearer of the mobile device, and obtaining, respectively, the current position and locomotion heading direction of the bearer.

The checker 130 receives the output of string-together module 128 and subjects same to a cross-check on the basis of external knowledge 70 as obtained by context awareness calibrator 62. Depending on the outcome of the check, checker 130 corrects the current position and optionally the bearer's locomotion heading direction and outputs this information 76 at its output, or it leaves this information un-amended and outputs same as information 76. In case of a correction measure, checker 130 also determines a correction signal 132, which changes the bearer specific data 126 and/or the filter coefficient in storage 108 shown in FIG. 6.

For example, the external knowledge 70 indicates the surrounding conditions around the bearer's position indicated at the output of string-together module 128, i.e. at the position where module 128 expects the bearer to be. Checker 130 now inspects whether the bearer's position where string-together module 120 expects the bearer to be, conflicts with plausibility checks: imagine, for example, that the bearer walks/moves along a long floor, which at the end turns right. For whatever reason, however, the estimated position of the bearer drags behind the real position of the bearer, and although the adaptive filter 56 detects the right turn of the bearer, checker 130 realizes that the assumed position suggests that the bearer bumps against the right-hand wall of the floor a small distance prior to the real floor's turn to the right. In that situation, it is very likely that a too small step length was applied in scaler 124, and accordingly checker 130 corrects this deficiency for the future position tracking via correction signal 132, i.e. it increases the bearer's specific step length in storage 126. Concurrently, checker 130 corrects the bearer's position 76 to correspond to the position the floor's right turn. Another example is the following: imagine that the bearer (again exemplarily assumed to be a human being) walks along a long, straight floor, but mapper 96 falsely assumes the bearer to slightly turn to the right each step the bearer takes. Imagine further that the filter coefficient stored in storage 108 is disadvantageously set to a too small value so that filter 104 does not filter-out the drift caused by the misinterpretation of mapper 96. In that case, checker 130 will realize that the bearer, instead of walking straight along the floor, touches the right-hand wall of the floor, and again upon realizing this, checker 130 may correct the bearer's position 76 to be in the middle of the floor again, with concurrently generating a correction signal 132 correcting the filter coefficient in storage 108 to be larger, so as to filter-out the light drift realized at the output of mapper 96.

The external knowledge signal 70 represents contextual data which stems from the context awareness calibrator 62. The latter has access to map data stored in storage 64 and looks up the bearer's surroundings at the position indicated to by signal 76. Beyond that, context awareness calibrator 62 receives the proximity signals $M_{PROX}$. That is, intermittently, context awareness calibrator 62 is able to precisely determine the bearer's actual position on the basis of the proximity signal $M_{PROX}$. For example, context awareness calibrator 62 locates a beacon which has caused a respective proximity signal in the map data stored in storage 64, and indicates this "actual" or true position to the movement quantifier 60 and checker 130, respectively, wherein the latter, in turn, may perform corresponding correction via correction signal 132 and adaptation of signal 76, respectively. Moreover, context awareness calibrator 62 is able to provide contextual data 70 to other modules, such as the pattern learning module 58 and filter 82, in order to alleviate or improve their functionality. For example, the context awareness calibrator 62 may inform the other modules on the surrounding of the bearer assuming that the bearer actually is at the position pointed to by signal 76. For example, if the bearer is currently in a staircase, it is likely that the bearer will undertake stair climbing. If the bearer is currently on a floor, and the floor turns to the right, it is likely that the bearer will follow the floor, i.e. turn to the right. In all of these instances, pattern learning module 58 as well as mapper 96 may optimize their computational effort so as to, for example, perform their internal correlations and comparisons with those patterns which fit best to the current condition or are most probable in the current context/situation.

Up to now, the pattern learning module 58 has not been described in detail. The pattern learning module 58 is an optional element of apparatus 50 which may be responsible for learning/generating an analysis parameter set 72 anew whenever the pattern recognizer 80 is unable to attribute the motion signals 88 to any of the already stored models in storage 84. In that case, the pattern learning module 58 may be configured to inspect a cyclic component in motion signals 66 and learn to deduce from its variation from cycle to cycle how far the wearer moves per cycle, and how much (and whereto) the wearer changes its heading direction. For example, the pattern learning algorithm 58 also uses the oriented version of the motion signal, i.e. signal 88, and additional exploits the contextual data 70 so as to generate a new analysis parameter set which may then be added to storage 84 along with a representative signal pattern for recognition by recognizer 80. As described below, cloud sharing may be used to improve the new analysis parameter sets. That is, for signal patterns (corresponding to respective carrying locations) which seem to occur with respect to a multitude of bearers of mobile devices, a more complex algorithm may be used externally (or centrally) to determine for all these wearers new analysis parameter sets which may then be downloaded to the individual wearers' apparatus' model storage 84.

If even pattern learning module 58 is unable to locate any cyclic component in the motion signal 66, then as a kind of last fallback position, apparatus 50 may purely rely on the motion signal 66 to track the bearer's position such as by subjecting the motion signals or fused data to integration.

After having described the modes of operation of apparatus 50, same is explained hereinafter again in other words in a summarizing manner. As explained above, the pure movement data 74 may be data that is purely related with a relative bearing change, i.e. a cycle in movement, such as, in the case of humans, the movement data produced as a consequence of a step, which is taken to move from one position in space to another. The pure movement data 74 is, accordingly, something free of noise inherent to sensor readings as well as other information that is not directly connected with the overall displacement of the human body, e.g. vibrations, accelerations caused by the manipulation of the mobile device, changing the location where the bearer carries the mobile device, among others. The pure movement data 74 may be, inside mapper 96, analyzed by movement quantification algorithms which translate each cycle into an amount of displacement such as step length, and direction of movement, such as the heading direction and change in altitude level, such as taking a step on a stair, with this translation leading to the descriptors 100 described above. The movement quantification algorithms used inside mapper 96 are controlled via the various analysis parameter sets and are, by this measure, specific, for example, for the location where the bearer currently carries the mobile device and where, accordingly, the mobile device is connected with the body of the bearer. Movement quantification algorithms as possibly used within mapper 96 may take into account the theoretical biomechanical and kinematical models of movement at that particular segment of the corpus where the mobile device is currently worn, which enables a quantification of each cycle of movement.

Further, as described above, the internal analyzing steps, or filters, applied to the fused sensor data 66/88 at the input of mapper 96 to extract the pure movement data use pre-sets in the form of analysis parameter sets that are specific, for example, to the bearer specific corpus and the specific location where the mobile device is currently connected with the body or object next to the body of the bearer.

Figure 8:
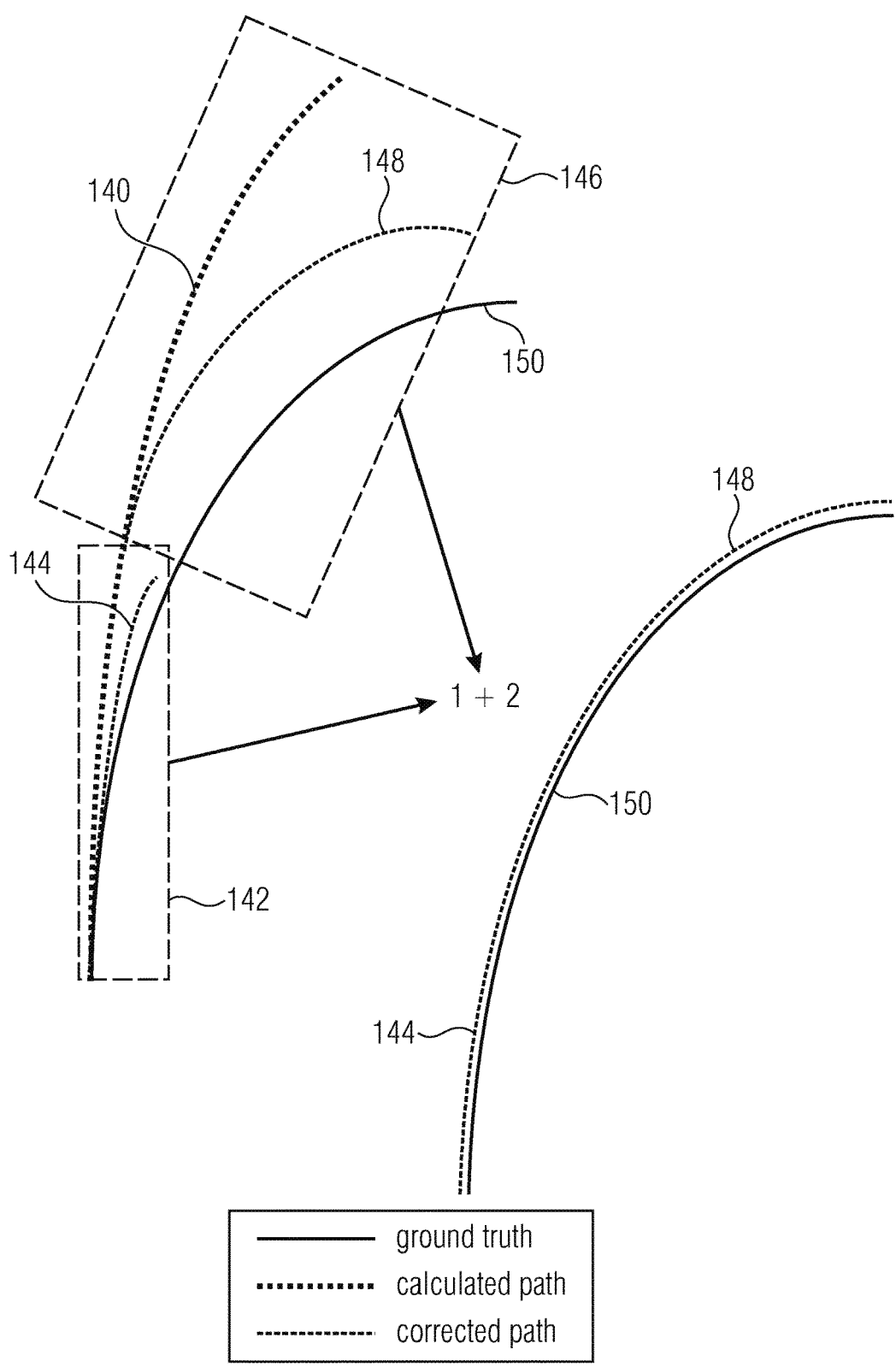
FIG. 8 shows schematically the mode of operation of the backward correction mechanism illustrated in FIG. 6, according to which backward windowed repositioning is performed based on data collected at the mobile device in the assumption that for a signal pattern a certain type of path has been taken.

As was also outlined above, the filtering performed by filter 104, i.e. its filter strength, may be backward corrected. In the case of slight movements that are below the intensity of the normal noise level, such as if the initiation of a slight turn is below the typical gait swing observed at the corpus location where the mobile device is currently carried by the bearer, and only at a later point it becomes clear that the bearer started to turn, a recalculation based on previously stored movement data is performed to determine the true starting point of a turn in order to optimize the final heading calculation. This was already described above with respect to FIG. 7, but is additionally also illustrated in FIG. 8. FIG. 8 shows, using the dotted line 140, the bearer's path as obtained at the output of string-together module 128 without the backward correction measure realized and activated using signal 114. 142. FIG. 8 shows that that portion of signal 74 which is cut-out by filter 104 (thereby actually not reaching the string-together module) so as to be replaced by the correspondingly reprocessed portion stored in buffer 110. The reprocessed path as obtained by stringing-together the descriptors as reprocessed is shown at 144. As can be seen, by way of the reprocessing, the turn of the bearer is detected earlier than without the reprocessing. The portion 146 of the bearer's steps following portion 142 are for example directly correctly processed by filter 104: as filter 104 now knows that the bearer intends to perform a turn to the right, less or no attenuation is performed within that portion 146, thereby leading to position path 148, which path, as can be seen in FIG. 8, closely corresponds to the real path walked by the bearer and indicated 150 in FIG. 8.

As already explained above, pattern recognizer 80 performs a kind of auto-selection of analysis parameter sets of filter pre-sets for motion patterns in, for example, specific carrying locations of a predetermined or one or more predetermined species, with the auto-selection being based on a best match of known motion signal patterns as described above. Filter pre-sets stored in storage 84 change, as described above, the type or the strength of the analysis applied to the fused sensor data in order to extract relevant information that correlates with the overall displacement of the bearer during walking. Analysis may be focused on the detection of gait cycles from noisy motion data acquired by movement sensors, i.e. $M_{MOV}$, in specific carrying locations of the corpus of the bearer, each cycle leading to the movement of the bearer in a certain direction, changing the relative position of corpus. Motion signal patterns are known theoretically, as models, noise-free in several carrying locations that enable the measured signals to be matched with a certain pattern from known models as was explained above with respect to FIG. 1 and then adapt automatically the type of analysis performed in filter 82 and 96, respectively, i.e. the filter pre-sets. Additionally, other filtering settings stored in storage 108, for example, adapt according to the context in which they are applied so that their strength fits in with the quality of strength of the noise sensor readings of the sensors $M_{MOV}$.

It should be noted that the pattern recognizer 80 continuously performs the pattern recognition or, speaking differently, continuously checks whether the conditions have changed so that another analysis parameter set should be selected instead. By this measure, an adaptation to a change of the location where the bearer carries the mobile device during the use of the mobile device is feasible. For example, the bearer may initially carry the mobile device in his or her pocket, and then the bearer may hold the mobile device at his/her ear in order to receive a call (in case the mobile device is a phone), and in that case, the pattern recognizer 80 will realize that another analysis parameter set has to be selected, i.e. the filter pre-sets have to be readjusted. In order to minimize the movement calculation error that is introduced by the change of location, that is defined by an unpredictable motion pattern and thus does not allow to detect for motion cycles and often also is accompanied by a change of movement (e.g. a person takes the mobile device out of the pocket while walking and stops at the same time to start typing on the mobile device, such as text message), a linear integration of the sensor data, such as the oriented version 88, between the loss of a motion cycle signal until a new one is detected, allows for updates of the movement data 74 and thus for an additional error reduction. The same mechanism may be used to eliminate side effects from the use of automated transport means (escalators, elevators, transport belts, etc.) in case they are not associated with reference points $R_n$ or metadata in the electronic map data stored in storage 64.

Alternatively or complementarily, and particularly when a change of carrying location of the mobile device is extended for longer periods of time, displacements of the bearer occurring these transitions may be evaluated using the best signal match available for the nearest carrying location, i.e. the best model among models stored in storage 84, where the signal patterns are previously known. Using this approach, signal noise (i.e. information that is not related to movement of the bearer, can be eliminated and the best possible approximation of the pure movement data during transition is used to clarify as much as possible the new position of the bearer in a three-dimensional space.

Figure 9:
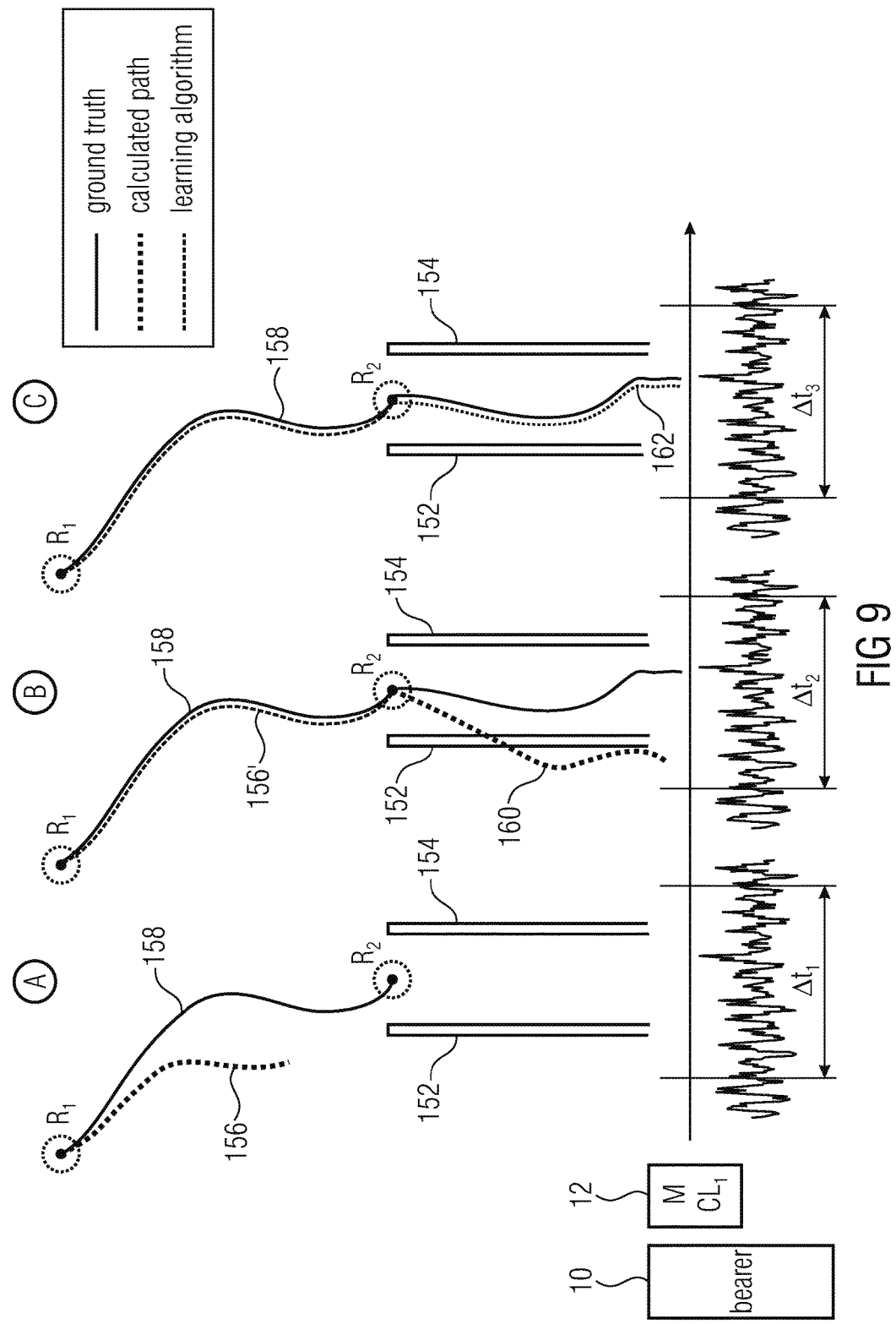
FIG. 9 shows a schematic diagram showing a path of the tracked position in different consecutive stages of the correction measures performed in the checker of FIG. 7, thereby realizing a pattern learning feature.

As explained with respect to the self-learning module 58, another feature of the filters presented above are outer adaptive parameters and self-learning motion cycle algorithms. Both features are based on the knowledge of the position and absolute distance of the different reference points $R_n$ and optionally, or additionally, taking into account meta information in the electronic map's data stored in storage 64. If the calculated distance of a path between two reference points $R_n$ differs from the reality, the related parameters such as step length (path scaling) and bearing interpretation are adjusted adaptively to reduce the error over time. This is illustrated again with respect to FIG. 9. FIG. 9 illustrates the bearer 10 and the mobile device 12 and assumes the model $CL_1$ as currently selected to corresponding to a certain carrying location, such as "holding mobile device at the bearer's ear". FIG. 9 also illustrates two reference points $R_1$ and $R_2$ and their associated maximum beacon reach. FIG. 9 also shows two walls 152 and 154, the presence and location of which is known from the map data 68 stored in storage 64, for example. FIG. 9 shows three consecutive situations in time: at A the bearer specific data in storage 126 was incorrect and accordingly the individual steps detected and measured by descriptors 100 were scaled using a step distance that was too small in scaler 126. The calculated path at the output of string-together module 128, indicated 156 in FIG. 9, thus wrongly suggests that the bearer has passed too short of a distance. At situation B, the bearer passes the second reference point $R_2$. Thus, a proximity sensor signal $M_{PROX}$ indicates to the context awareness calibrator 62 that the actual position of the bearer is the reference position of the respective beacon, i.e. position $R_2$. Accordingly, checker 130 corrects the current position and corrects, via correction signal 132, the bearer specific data within storage 126 with respect to the bearer's step size, so that if the past sequence of descriptors 74 between reference location $R_1$ and reference location $R_2$ would be reprocessed by scaler 124 they would completely bridge the entire distance between both reference points. Such a theoretically reprocessed version of the path is shown at 156'. As can be seen, it closely corresponds to the actual path taken by the bearer and indicated 158 in FIG. 9. At B in FIG. 9, it is also shown that the estimated path taken by the bearer as obtained at the output of string-together module 128 after the bearer passing reference location $R_2$ as indicated at 160 in FIG. 9, is quite good as far as the step length is concerned, but suffers from a wrong estimate of the bearer's locomotion heading direction at reference location $R_2$. However, the checker 130 is able to detect by a comparison between the estimated path 160 and the location of wall 152 that the estimated path of the bearer conflicts with plausibility checks: the bearer is not able to go through a wall. Accordingly, checker 130 is able to correct retrospectively the bearer's locomotion heading direction at reference location $R_2$, thereby ending up in situation C, at the time of the second correction, in an estimated bearer's path 162 which closely follows the actual path taken by the bearer.

Motions of bearers that have disabilities or are even from an unknown species with no already available filter model to provide accurate results, are scanned from cyclic motion patterns in the pattern learning module 58, that then again are compared to the reality based on the reference points as just illustrated with respect to FIG. 9 and motion cycles are translated into real movement information in mapper 96 using thus learned analysis parameter sets. This knowledge is improved adaptively over time, each time reference points $R_n$ or meta information from map data 68 are taken into account. Learned cyclic motion patterns 72 are used as reference matching patterns together with the previously known models, and enable the automatic recognition of an additional model corresponding to an additional carrying location, for example, and the automatic adjustment of filter pre-sets for this specific location may be performed just as with respect to already existing models.

Thus, using the embodiment described above, a movement of a bearer is not actually estimated, but is truly calculated on the basis of motion cycles perceived as patterns derived from pure sensor data.

The embodiment described above is also able to be flexible enough to comply with the inclusion of different reference signal technologies $R_n$. Many reference technologies are feasible, such as ones that provide absolute position with high accuracy as well as ones that return a position where a person is more likely to be. All of these references contribute with important information that is considered by motion tracking algorithms for the bearer's position adjustment, calibration of filters parameters, pre-sets readjustments and for the self-learning of not previously known motion patterns. Information from map data is also considered as an input, providing information equivalent to that extracted for reference points $R_n$. Information from a map data, such as the map data of storage 64, also creates context awareness which enables the system to adapt according to the specific activity/movement that the bearer is expected to perform, and accepted level for positioning granularity in each specific context, such as navigational purposes, tracking of a person at home, etc. Filter parameters and characteristics may be adapted taking into account the desired accuracy in order to avoid heavy processing of data and therefore saving battery of the mobile device or apparatus 50, respectively. The most typical movements, such as slightly turn, changing direction, walking forward, that are expected to be performed during the execution of a certain activity, such as shopping, sightseeing, etc., as well as the types of movements that are more likely to occur based on map characteristics, such as maps with long corridors, are taken into account by adaptive filters whose strength adapts accordingly.

Figure 10:
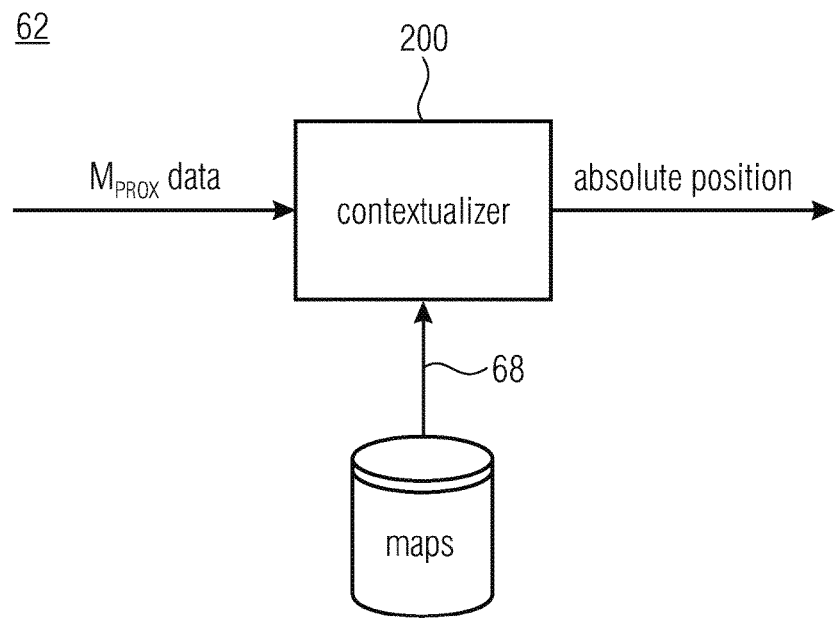
FIG. 10 shows a block diagram of an internal structure of the context awareness calibration module 62 of FIG. 4 in accordance with an embodiment.
Figure 11:
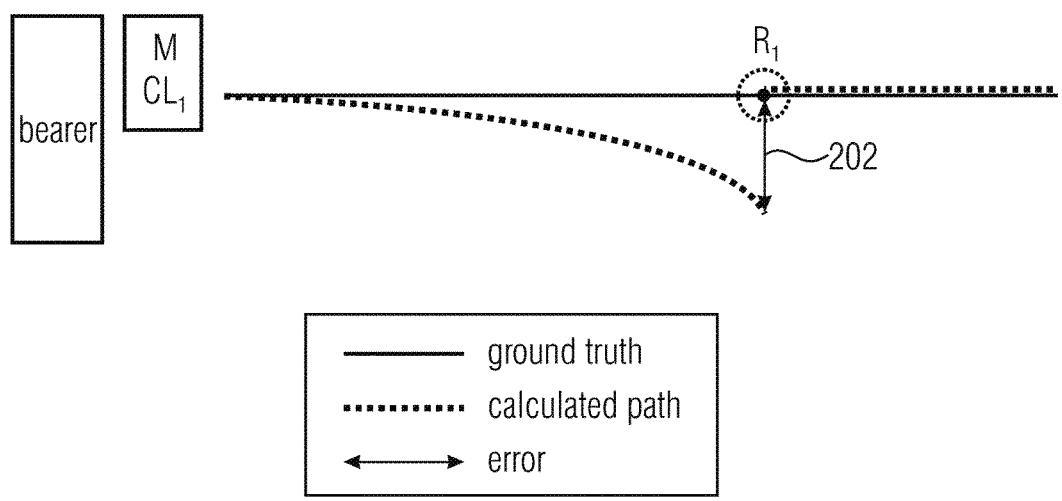
FIG. 11 shows a schematic diagram illustrating the position correction performed by the checker of FIG. 130 in accordance with an embodiment.

For the sake of completeness, FIG. 10 shows that the context awareness calibrator 62 of FIG. 4 may internally comprise a contextualizer 200, which maps, using the proximity signals $M_{PROX}$ and the map data 68 from storage 64, to an absolute position, namely a reference position of a respective beacon. FIG. 11 illustrates what was described above with respect to checker 130: a correction 202 of the estimated position of the bearer may take place each time the bearer passes a reference position $R_1$.

Thus, in other words, the above description described, inter alias, a method of tracking in real time the relative location of a bearer of a mobile device based on filtering motion data provided by motion sensors of the mobile device with species and/or location specific body movement models. Although described with respect to human bearers, embodiments of the present application are applicable to other species as well, are applicable to indoors, outdoors, on the earth, under the earth, in water, in the air or in space applications. The method may comprise the reception of a plurality of sensor readings of motion sensors and performing sensor fusion to track the orientation of the mobile device relative to the earth coordinate system and return motion data in earth coordinates. The sensor fusion may enable the system to cover the three-dimensional space, including the evaluation of movement in horizontal surfaces and between different levels. The filtering may be applied to extract the movement signal information that is hidden in the noisy sensor data provided by motion sensors. The movement signal information may be used to evaluate the relative position of a bearer in a certain three-dimensional space, e.g. by evaluating the displacement and direction of movement (heading) when a step is taken. Preconfigured filtering settings may be present which are specific for species and carrying location for the mobile device, and motion data acquired by motion sensors and cyclic motion patterns may also be specific for that specific carrying location and species.

Filter pre-sets may automatically be adjusted based on a best match of pure motion sensor data with known cyclic motion sensor patterns at that particular carrying location. The remaining error or movement signal information that is due to the specificities of certain bearer walking characteristics and external influences may be periodically removed by references $R_n$ by means of position adjustment and calibration. The method may further comprise outer-adaptive filter settings, improving over time, according to the calibration results. Calibration may be based on the knowledge of the position and absolute distance of the different reference points $R_n$ and optionally by additionally taking into account meta information on the electronic maps available in the apparatus. For example, this may be done to correct step length and bearer interpretation. Unknown models of cyclic patterns of motion may be learned using self-learning motion cycle algorithms that scan for cyclic motion patterns and compare them to the reality based on reference points $R_n$ or map data. Learned patterns may be stored and used as matching pattern models for future reference to translate pure motion sensor data from sensors into real movement information. Learned patterns might also get uploaded to a cloud and then analyzed (e.g. to find out advantageous usage positions and then to provide a 'prefect pre-set model' that is replacing the observation based model, thereby taking advantage of crowd sourcing. Backward correction of movement data based on information acquired between known reference points $R_n$ or map data or additionally based on the analysis and interpretation of motion data such as to correct filter strength in case of slight movements that are below the intensity of the normal noise level, is also feasible. The method may further comprise a methodology to cope with errors introduced by the change of location where the mobile device is carried by the bearer and that is defined by an unpredictable motion pattern that does not allow to detect motion cycles. The method may then include a linear integration of the sensor data from the motion sensors during transition for an additional error correction, or an evaluation of movement during transitions by using the best signal match model available at the closest carrying location. The method may also comprise the interpretation of the normal behavior of the bearer walking in a specific context, such as the most frequent patterns of movement (forward walk, slight turning, changing direction, etc.) encountered in specific contexts and the type of map in that particular context.

The above description showed that it is feasible to use an infrastructure as illustrated with respect to FIG. 3, to use a processing unit of a mobile device in tracking the position of a bearer. The processing unit may receive data from the movement or motion sensors of the mobile device and occasionally from the proximity sensors of the mobile device upon the bearer passing a reference point $R_n$. To increase the accuracy of the positioning information that is calculated by the processing unit and apparatus 50, measures may be taken to increase the accuracy of the system. For example, living bearers, which may be animals or humans, of the mobile device are considered to have a corpus, and the mobile devices attached to the corpus at a known or unknown location. The mobile device can also be attached to an object carried by a bearer, i.e. a living being, in a certain location such as, for example, a cane, or an object the living being uses for transportation such as a wheel chair. Furthermore, the corpus may contain a structure formed out of bones, or fish bones, which are connected by joints that allow limited movements of the different bones against each other. Therefore, each of the carrying locations of a specific species with a corpus is performing specific motion patterns when the bearer is carrying out specific movements like walking, swimming, flying, etc. The embodiment described above allows to filter and extract the movement signal information that is hidden in the noisy and inaccurate pure sensor data by detecting body motion patterns. The above embodiments allow tracking the relative movement of the corpus such as in order to calculate the position of a human in an area where common location technologies like satellite based on positioning systems are not available. Other examples could be to track fish underwater or cattle in large stables. In accordance with one scenario, humans are tracked, i.e. humans that use a mobile device such as in indoor environments. In this circumstance, the above embodiments may track the indoor location of people in real time, based on the use of e.g. a smartphone as a mobile device. The relative position of the people walking inside buildings may be tracked. The motion is detected and analyzed taking into account the normal patterns of human locomotion, acquired by an inertial measurement unit or other motion sensor that is formed by the motion sensors included in the mobile device. The system is set to consider the enclosure of external information, regardless of its origin, being scalable to add or remove different information layers. Accordingly, the system is flexible enough to consider as input different referencing technologies $R_n$ that are formed by the proximity sensors as well as information from mapped data as described above.

Finally, regarding the above described embodiments, the following is noted. In particular, in the embodiments described so far, the fused data was used as a basis for the pattern recognition as well as the filtering 82. However, one or both of them may alternatively operate on non-fused motion signals such as the raw signals as obtained by the motion sensors directly. As far as the orienting module is concerned, it is noted that the pattern recognizer 80 may alternatively operate on a non-oriented version of the motion signals or fused data and the same applies to filter 82. As far as the backward-correction mechanism is concerned, which was described in connection with FIGS. 6 and 8, it is noted that the reprocessed version buffered may alternatively be in a domain prior to the mapping by mapper 96, i.e. the buffered version may relate to the motion signals either in the fused and oriented version or some other version. By this measure, mapper 96 may treat certain maneuver signal patterns, such as signal patterns relating to turning, more probable than at the time of first processing this buffered portion of the inbound motion signals.

Even further, it is noted that many of the details brought forward above with respect to the exploitation of map data 68 are optional. The same applies to the presence and exploitation of the detection of beacons. That is, the continuous improvement of the analysis parameter sets and/or bearer specific data is optional and may be left off. The same applies to the presence or non-presence of the self-learning module 58. In accordance with an alternative embodiment, the apparatus 50 does not comprise the self-learning ability.

Although the above description often favored the integration of apparatus 50 in the mobile device itself, such as in the form of software running on the mobile device's processing unit 16, it should be noted that different implementations are feasible as well. For example, imagine mobile devices which allow for sending-out the stream of motion sensor data in a wireless manner, i.e. data $M_{MOV}$, to an apparatus 50 which is, however, implemented externally to the mobile device. Such an external apparatus 50 could in fact be used in order to track the position of a plurality of mobile devices and the bearers carrying the same, respectively. By this measure, the computational burden would be shifted from the mobile devices to some central apparatus 50.

As far as the co-existence of orienting module 78 and pattern recognizer 80 is concerned, it is noted that pattern recognizer 80 itself may take the bearer's current locomotion heading direction into account when finding the best match between the stored signal patterns associated with the various models on the one hand, and the current inbound fused data or motion signals on the other hand. The pattern recognition could, however, alternatively be performed on the basis of a coordinate-independent motion-related information, such as for example an absolute value of the strength of the mobile devices acceleration. Furthermore, as became clear from the description of FIG. 9, it may be favorable for improving the assessment of an appropriate correction signal by checker 130 to store some history of most recent locomotion cycle descriptors, either in a scaled or unscaled version, in order to improve the adjustment of the correction signal.

With regard to the sensor fusion module 54, it is noted that same may in fact be external to apparatus 50. The mobile device 12, for example, may comprise the sensor fusion module 54 in addition to apparatus 50.

Although some aspects have been described in the context of an apparatus, it is clear that these aspects also represent a description of the corresponding method, where a block or device corresponds to a method step or a feature of a method step. Analogously, aspects described in the context of a method step also represent a description of a corresponding block or item or feature of a corresponding apparatus. Some or all of the method steps may be executed by (or using) a hardware apparatus, like for example, a microprocessor, a programmable computer or an electronic circuit. In some embodiments, some one or more of the most important method steps may be executed by such an apparatus.

Depending on certain implementation requirements, embodiments of the invention can be implemented in hardware or in software. The implementation can be performed using a digital storage medium, for example a floppy disk, a DVD, a Blu-Ray, a CD, a ROM, a PROM, an EPROM, an EEPROM or a FLASH memory, having electronically readable control signals stored thereon, which cooperate (or are capable of cooperating) with a programmable computer system such that the respective method is performed. Therefore, the digital storage medium may be computer readable.

Some embodiments according to the invention comprise a data carrier having electronically readable control signals, which are capable of cooperating with a programmable computer system, such that one of the methods described herein is performed.

Generally, embodiments of the present invention can be implemented as a computer program product with a program code, the program code being operative for performing one of the methods when the computer program product runs on a computer. The program code may for example be stored on a machine readable carrier.

Other embodiments comprise the computer program for performing one of the methods described herein, stored on a machine readable carrier.

In other words, an embodiment of the inventive method is, therefore, a computer program having a program code for performing one of the methods described herein, when the computer program runs on a computer.

A further embodiment of the inventive methods is, therefore, a data carrier (or a digital storage medium, or a computer-readable medium) comprising, recorded thereon, the computer program for performing one of the methods described herein. The data carrier, the digital storage medium or the recorded medium are typically tangible and/or non-transitionary.

A further embodiment of the inventive method is, therefore, a data stream or a sequence of signals representing the computer program for performing one of the methods described herein. The data stream or the sequence of signals may for example be configured to be transferred via a data communication connection, for example via the Internet.

A further embodiment comprises a processing means, for example a computer, or a programmable logic device, configured to or adapted to perform one of the methods described herein.

A further embodiment comprises a computer having installed thereon the computer program for performing one of the methods described herein.

A further embodiment according to the invention comprises an apparatus or a system configured to transfer (for example, electronically or optically) a computer program for performing one of the methods described herein to a receiver. The receiver may, for example, be a computer, a mobile device, a memory device or the like. The apparatus or system may, for example, comprise a file server for transferring the computer program to the receiver.

In some embodiments, a programmable logic device (for example a field programmable gate array) may be used to perform some or all of the functionalities of the methods described herein. In some embodiments, a field programmable gate array may cooperate with a microprocessor in order to perform one of the methods described herein. Generally, the methods are performed by any hardware apparatus.

The apparatus described herein may be implemented using a hardware apparatus, or using a computer, or using a combination of a hardware apparatus and a computer.

The methods described herein may be performed using a hardware apparatus, or using a computer, or using a combination of a hardware apparatus and a computer.

While this invention has been described in terms of several advantageous embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

The invention claimed is:

1. Apparatus for tracking a position of a bearer of a mobile device on the basis of one or more motion sensors comprised by the mobile device, the apparatus comprising
a processor or electronic circuit configured to, or a computer programmed to
based on motion signals gained from the one or more motion sensors, select one of a plurality of analysis parameter sets so as to acquire a selected analysis parameter set, by discriminating between different signal patterns associated with the analysis parameter sets; and
analyze the motion signals using the selected analysis parameter set so as to acquire a signal indicating a locomotion of the bearer,
update, on the basis of the signal indicating the locomotion of the bearer, a position signal indicating a position of the bearer,
compare the position signal with map data and/or discontinuously occurring registration signals indicating the mobile device's passing of any predetermined reference location so as to correct the position signal and acquire a correction signal and
adjust the selected analysis parameter set and/or bearer specific data used to perform the update of the position signal on the basis of the signal indicating the locomotion of the bearer, depending on the correction signal.

2. Apparatus according to claim 1, wherein the processor or electronic circuit is configured to, or the computer programmed to, continuously or intermittently repeat the selection.

3. Apparatus according to claim 1, wherein the processor or electronic circuit is configured to, or the computer programmed to, receive the motion signals from the one or more motion sensors via a sensor fusion module configured to perform sensor fusion on raw signals of the one or more motion signals such that the motion signals refer to a coordinate system vertically aligned.

4. Apparatus according to claim 1, wherein the motion signals are formed by a multi-component time-varying signal three-dimensionally indicating movements of the mobile device.

5. Apparatus according to claim 1, wherein the motion signals are received from the one or more motion sensors via a sensor fusion module configured to perform sensor fusion on raw signals of the one or more motion signals such that the motion signals refer to a coordinate system vertically aligned and the processor or electronic circuit is configured to, or the computer programmed to, take a currently determined locomotion heading direction of the bearer into account in performing the selection by orienting the coordinate system so as to be aligned to the currently determined locomotion heading direction.

6. Apparatus according to claim 1, wherein the processor or electronic circuit is configured to, or the computer programmed to, translate the motion signals into a coordinate system aligned with a currently determined locomotion heading direction of the bearer.

7. Apparatus according to claim 1, wherein the plurality of analysis parameter sets are associated with different carrying locations of the mobile device on a human bearer.

8. Apparatus according to claim 1, wherein the processor or electronic circuit is configured to, or the computer programmed to, acquire a sequence of locomotion cycle descriptors as the signal indicating the locomotion of the bearer, each describing the bearer's self-propelling in terms of passed distance per locomotion cycle and directional change per locomotion cycle.

9. Apparatus according to claim 8, wherein the locomotion cycle descriptors correspond to human steps and the passed distance is a human step length.

10. Apparatus according to claim 8, wherein the processor or electronic circuit is configured to, or the computer programmed to, perform the mapping in a manner depending on map data.

11. Apparatus according to claim 10, wherein the processor or electronic circuit is configured to, or the computer programmed to, acquire the contextual data from map data.

12. System comprising an apparatus according to claim 1 and beacons at reference locations.

13. Apparatus according to claim 1, wherein the processor or electronic circuit is configured to, or the computer programmed to, in performing the comparison track, using the position signal, the position of the bearer in a map and correct the position signal to prevent the position of the bearer from entering map predetermined non-entrance areas.

14. Apparatus according to claim 1, wherein the processor or electronic circuit is configured to, or the computer programmed to, in performing the comparison
track, using the position signal, the position of the bearer in a map and correct the position signal to prevent the position of the bearer from performing in reality impossible movements.

15. Apparatus according to claim 1, wherein the processor or electronic circuit is configured to, or the computer programmed to, in performing the comparison
check whether one of the discontinuously occurring registration signals is currently detected, and, depending on the check, if one of the discontinuously occurring registration signals is currently detected, compare the position of the bearer indicated by the position signal with a predetermined reference location associated with the one discontinuously occurring registration signal so as to correct the position signal and acquire a correction signal.

16. Apparatus according to claim 15, wherein the processor or electronic circuit is configured, or the computer programmed, so that the checking whether one of the discontinuously occurring registration signals is currently detected, involves surveilling whether a proximity sensor detects an entrance of a reach of a beacon signal.

17. Method for tracking a position of a bearer of a mobile device on the basis of one or more motion sensors comprised by the mobile device, the method comprising
based on motion signals gained from the one or more motion sensors, selecting one of a plurality of analysis parameter sets so as to acquire a selected analysis parameter set, by discriminating between different signal patterns associated with the analysis parameter sets; and analyzing the motion signals using the selected analysis parameter set so as to acquire a signal indicating a locomotion of the bearer, wherein the analyzing comprises updating, on the basis of the signal indicating the locomotion of the bearer, a position signal indicating a position of the bearer, comparing the position signal with map data and/or discontinuously occurring registration signals indicating the mobile device's passing of any predetermined reference location so as to correct the position signal and acquire a correction signal and adjusting the selected analysis parameter set and/or bearer specific data used to perform the update of the position signal on the basis of the signal indicating the locomotion of the bearer, depending on the correction signal.

18. A non-transitory digital storage medium having a computer program stored thereon to perform the method for tracking a position of a bearer of a mobile device on the basis of one or more motion sensors comprised by the mobile device, the method comprising based on motion signals gained from the one or more motion sensors, selecting one of a plurality of analysis parameter sets so as to acquire a selected analysis parameter set, by discriminating between different signal patterns associated with the analysis parameter sets; and analyzing the motion signals using the selected analysis parameter set so as to acquire a signal indicating a locomotion of the bearer, wherein the analyzing comprises updating, on the basis of the signal indicating the locomotion of the bearer, a position signal indicating a position of the bearer, comparing the position signal with map data and/or discontinuously occurring registration signals indicating the mobile device's passing of any predetermined reference location so as to correct the position signal and acquire a correction signal and adjusting the selected analysis parameter set and/or bearer specific data used to perform the update of the position signal on the basis of the signal indicating the locomotion of the bearer, depending on the correction signal, when said computer program is run by a computer.

* * * * *